United States Patent [19]

Anderson et al.

[11] Patent Number: 5,548,960
[45] Date of Patent: Aug. 27, 1996

[54] PELLET EXTRUDING MACHINE

[76] Inventors: William E. Anderson, Rte. #2, Box 97, Jefferson, Ga. 30549; Donald M. Davis, 5046 Ponderosa Farm Rd., Gainsville, Ga. 30507; Jon L. Curzon, 3331 Romelie Dr., Atlanta, Ga. 30340

[21] Appl. No.: 346,491

[22] Filed: Nov. 29, 1994

Related U.S. Application Data

[63] Continuation-in-part of Ser. No. 91,143, Jul. 13, 1993, Pat. No. 5,419,138.

[51] Int. Cl.⁶ .................................................. F25J 1/00
[52] U.S. Cl. ............................. 62/605; 62/341; 55/523
[58] Field of Search ....................... 62/341, 35; 55/523

[56] References Cited

U.S. PATENT DOCUMENTS

| | | | |
|---|---|---|---|
| Re. 30,632 | 6/1981 | Breysse et al. ........................ 210/236 |
| 3,576,112 | 4/1971 | Frost et al. ............................. 62/35 X |
| 3,762,566 | 10/1973 | Del Pico ................................ 210/490 |
| 3,837,146 | 9/1974 | Faure et al. ............................. 96/7 |
| 4,227,527 | 10/1980 | De Frank et al. ..................... 55/523 X |
| 4,457,487 | 7/1984 | Steigerwald ........................... 251/339 X |
| 5,419,138 | 5/1995 | Anderson et al. ..................... 62/341 X |

*Primary Examiner*—William E. Tapolcai
*Attorney, Agent, or Firm*—Jones, Day, Reavis & Pogue

[57] ABSTRACT

An extruder and methods for converting pressurized liquid $CO_2$ feed into dry ice pellets of predetermined shape and size, wherein the $CO_2$ snow formation, $CO_2$ snow compaction, and dry ice pellet extrusion phases occur simultaneously to achieve production rates on the order of 700–1000 lbs/hr. The increased production rates are achieved utilizing sintered plastic filter media to provide enhanced removal of $CO_2$ gas from the $CO_2$ snow formation chamber.

10 Claims, 12 Drawing Sheets

5,548,960

PELLET EXTRUDING MACHINE

This is a continuation-in-part of application Ser. No. 08/091,143 filed on Jul. 13, 1993, now U.S. Pat. No. 5,419,138.

BACKGROUND OF THE INVENTION

The present invention relates generally to apparatus for rapidly and efficiently producing large quantities of dense pellets from injected, liquified compressed gases such as carbon dioxide ($CO_2$).

Carbon dioxide is a gas under ambient conditions, has a boiling point of −109° F. and can exist simultaneously in solid, liquid and gaseous phases at its triple point (i.e., at a temperature of −69.83° F. and a pressure of 75.13 psia). When compressed under pressure, $CO_2$ gas liquifies and such liquified $CO_2$ may be transformed into solid crystalline particles by injecting the material through an orifice or nozzle into an extrusion chamber at a lower pressure, such as ambient pressure, whereupon the triple point for $CO_2$ is reached, and the liquified $CO_2$ is converted into crystalline particles or "snow." During this phase transformation process, significant volumes of gaseous $CO_2$ boil off, and are vented to the atmosphere, or may be captured, reliquified, and used once again to form snow.

Many applications for the resulting $CO_2$ snow particles are known in the trade. For example, the snow may be used to directly contact or surround food to refrigerate or quick freeze it, and sublimated $CO_2$ vapor is recovered. See, e.g., U.S. Pat. Nos. 4,137,723 issued to Tyree, Jr., and 5,170,631 issued to Lang et al. Food may also be frozen by using a liquid $CO_2$ cryogen as a heat exchange medium. See, e.g., U.S. Pat. Nos. 4,165,618 issued to Tyree, Jr., and 4,356,707 issued to Tyree, Jr. et al.

Carbon dioxide snow can likewise be used to cool equipment parts that cannot be lubricated, and therefore are subject to frictional heat buildup. Moreover, the snow can be sprayed onto chemical spills or leaking fluids to freeze them for pickup before they seep into the ground. Furthermore, burning liquids can be cooled below their ignition temperature, and blanketed above by $CO_2$ vapor to extinguish fires.

Another market for $CO_2$ pellets is as blasting media for removing paint or other debris from buildings, road surfaces, airplanes, etc. In this regard, sand particles or other types of grit traditionally, have been blasted at stone or concrete surfaces to remove such unwanted debris. For example, U.K. Application No. 2,077,157 published in the name of Parfloor Ltd. discloses an apparatus and process for treating roadway surfaces in which cryogenic liquid $CO_2$ is contacted with the road surface to cool it, and freeze any tire rubber, oil, etc., thereupon, after which it is bombarded with cooled shot, grit, or other suitable particles to remove the frozen residue. While the liquid $CO_2$ sublimates and evaporates upon contact with the road surface, the bombarded shot or grit must be collected for removal. Therefore, this process requires messy clean up of the solid particle medium.

Moreover, use of shot or grit with comparatively delicate surfaces like paint covered aircraft fuselages would be unsuitable, since it would severely damage the underlying fuselage surface in addition to removing the unwanted paint. Therefore, liquid chemicals have traditionally been employed in such applications to soften the paint, after which high-pressure water is used to remove it, so the aircraft may be properly inspected for cracks in the skin. However, large quantities of paint sludge are generated in this process, which must be disposed of in compliance with increasingly stringent and expensive environmental guidelines.

Mercer Engineering Research Center of Warner Robins, Ge. has developed a process for iceblasting the fuselage skin with dry ice particles in which the $CO_2$ pellets sublimate upon contact with the fuselage, thereby, leaving only the paint chips to be swept up for disposal. While U.S. Pat. Nos. 5,009,240 issued to Levi, and No. 4,655,847 issued to Ichinoseki et al. teach methods for cleaning semiconductor wafers or other substrates with bombarded ice ($H_2O$) pellets, or a combination of ice and dry ice particles, it has been found that dry ice pellets are more suitable due to their ready sublimation properties.

It is known in the trade to flash liquid $CO_2$ maintained at 300 psi and 0° F. into a snow formation horn maintained at atmospheric pressure. Due to the sudden drop in pressure, a portion of the liquid $CO_2$ crystallizes from its liquid phase to a solid "snow" phase. Attendant with the snow formation is a significant amount of $CO_2$ gas that boils off as the triple point for $CO_2$ is reached. U.S. Pat. No. 4,390,356 issued to Preiss et al. discloses such a transformation in a separator cone of a cyclone-type $CO_2$ snow generator in which $CO_2$ liquid is injected against flexible polyethylene or polypropylene cone walls to induce vibrations that reduce snow build-up upon the walls. U.S. Pat. No. 4,377,402 issued to Crowe et al. teaches refrigerated temperature control of the injected liquid $CO_2$ feed in order to increase the production of $CO_2$ snow in the snow horn. Similarly, U.S. Pat. No. 4,111,671 issued to Williamson illustrates a curved profile for the snow horn to enhance separation of the snow from the horn.

The lumps of $CO_2$ snow may then be fed to a grinding mill to produce particles of a desired size, as taught by U.S. Pat. No. 4,707,951 issued to Gibot et al. However, it is very difficult to control the shape of resulting ground particles. Moreover, such a process in which $CO_2$ snow is accumulated in lumps which are subsequently ground are unlikely to have the requisite density for use in sandblasting applications.

An alternative approach is to form small $CO_2$ snow flakes in a small expansion chamber, which are then conveyed to a larger expansion chamber in which numerous snowflakes agglomerate into large $CO_2$ snow particles, as disclosed by U.S. Pat. No. 5,125,979 issued to Swain et al. Once again, however, it is difficult to produce by means of agglomeration the kind of particles having uniform size, shape, and density characteristics needed for sand-blasting applications.

A better method for preparing $CO_2$ snow pellets, therefore, is by extrusion of compacted $CO_2$ snow. One of the earliest $CO_2$ pellet extruders was commercialized by Liquid Carbonic Corporation of Chicago, Ill. in 1969. As shown schematically in FIG. 1 herein, extruder 10 comprised an extrusion chamber 12 having a 6-inch bore (inside diameter) with an opening 14 along a portion of the top surface thereof. Mounted over opening 14 was a chimney 16. Mounted to the one open end of extrusion chamber 12 by means of reinforced bolts 18 was die plate 20.

Positioned inside extrusion chamber 12 was piston head 22, which was reciprocated by means of piston shaft 24 and hydraulic cylinder 26. Liquid $CO_2$ under high pressure was delivered to chimney 16 by means of inlet nozzle 28 and conduit 30, whereupon the transformation of the liquid $CO_2$ at the triple point previously discussed occurred to form $CO_2$ snow. Resulting $CO_2$ gas was vented through outlet stack 32. Upon retraction of piston head 22 within extrusion chamber 12 by hydraulic cylinder 26, $CO_2$ snow in chimney 16 fell by means of gravity into extrusion chamber 12. Excess $CO_2$ gas not immediately expelled through vent 32 assisted in pushing the $CO_2$ snow into extrusion chamber 12. As soon as hydraulic cylinder 26 reciprocated piston head 22 forward in extrusion chamber 12 once again, the $CO_2$ snow contained therein was compacted and extruded through holes 34 machined into die plate 20 in a single motion to produce dry ice pellets 36.

This Liquid Carbonics extruder suffered from several deficiencies. First, the $CO_2$ snow needed to be compacted by 75% of its volume in order to increase the density enough for proper extrusion. This compaction force required enormous power in the form of hydraulic cylinder 26 having a 10-inch bore, 30-inch stroke, and 300 gal hydraulic reservoir with 90 gallon and 45 gallon pumps. The extrusion housing 11 enclosing extrusion chamber 12, along with die plate 20 and bolts 18 needed to be reinforced to withstand the tremendous pressures applied by hydraulic cylinder 26.

Second, because of the extremely long 30-inch stroke of hydraulic cylinder 26 and the resulting length of piston shaft 24, web plate 37 was positioned between hydraulic cylinder 26 and extruder housing 11 to accommodate the requisite distance between the two components. Because of the thrust discharged by hydraulic cylinder 26, tie rods 38 and 39 were used to connect hydraulic cylinder 26 and extruder housing 11, respectively, to web plate 37 in order to avoid misalignment of the parts that might interfere with the calibrated movement of piston head 22 in extrusion chamber 12. Tie rods 38 and 39 had to be secured thereto by bolts rotated by 1350 ft-lbs of torque.

Third, extruder 10 was very inefficient in terms of producing dry ice pellets 36, because most of the long 30-inch piston head movement was devoted to compacting the $CO_2$ snow, not extruding dry ice pellets. Production of dry ice pellets 36 was also limited by the time required to deliver $CO_2$ snow formed in the 10–12 foot tall chimney 16 to extrusion chamber 12 by means of gravity (with a small assist from the residual $CO_2$ gas in chimney 16). It was only because of the large scale of the extruder and resulting amount of $CO_2$ snow that could be formed in chimney 16 that these compaction and extrusion inefficiencies were overcome sufficiently to produce approximately 1000 lbs/hr of dry ice pellets. The resulting extruder 10 weighed 10,000 lbs and lacked any degree of portability and, therefore, was generally installed only as stationary equipment for operating purposes.

FIG. 2 herein shows a slightly more efficient design for an extruder 40 in the form of a single path, linear, sequential pellet extruder. As exemplified by U.S. Pat. No. 5,109,636 issued to Lloyd et al., and a device currently sold by Tomco, the extruder or cylinder housing 42 contains an extrusion chamber 44 with a 3 ¼-inch diameter bore and similarly sized piston head 46 positioned therein. Mounted to the front end is die plate 48 having a plurality of holes 50 machined therethrough. Die plate 48 is typically 1½ inches thick. The holes 50 are chosen for the desired dry ice pellet 52 diameter, and typically vary between 0.004 inches and 1.0 inches in diameter.

Mounted to the back end of extruder housing 42 by means of web plate 54 is hydraulic cylinder 56 that operates piston shaft 58 connected to piston head 46 with a 13-inch stroke. Once again, because of the thrust forces applied by hydraulic cylinder 56, ⅝-inch diameter tie rods 59 and 60 under 100 ft-lbs of torque are used to connect hydraulic cylinder 56 and extruder housing 42, respectively, to web plate 54 in order to ensure proper alignment of piston head 46 with extrusion chamber 44.

Hydraulic cylinder 56 is controlled electronically and opens directional flow valves to enable hydraulic fluid to be pumped from and be returned to a reservoir, as is known in the trade. The fluid actuates the hydraulic cylinder by charging and exhausting oil from each side of the cylinder piston.

In a conventional dry ice pellet extrusion cycle for the Tomco in-line, linear or single path, sequential extruder 40, liquid $CO_2$ under high pressure is injected from tank 62 directly into extrusion chamber 44 once control valve 63 is opened. The liquid $CO_2$ transforms phases to form snow in the extrusion chamber, while venting $CO_2$ gas through exhaust port 64. Next, hydraulic cylinder 56 moves piston head 46 forward in extrusion chamber 44 to compact a mass of $CO_2$ snow formed therein against die plate 48 to increase the density thereof. By pushing the compacted $CO_2$ snow through holes 50 in die plate 48, dry ice pellets 52 are extruded.

While such an in-line, single path or linear, sequential extruder 40 is more efficient than the Liquid Carbonics machine 20, because the $CO_2$ snow is formed directly in the extrusion chamber 44, instead of in a separate chimney 16 from which the snow must be transported by gravity, it still suffers from several problems that limit the extent to which it can produce dry ice pellets 52. First, because the liquid $CO_2$ injection, $CO_2$ snow formation, $CO_2$ gas venting, $CO_2$ snow compaction, and dry ice pellet extrusion functions occur sequentially in the machine, the extruder 40 is limited to approximately one cycle per minute (i.e., roughly 35 seconds to inject the liquid $CO_2$, form snow, and vent the $CO_2$ gas, and 25 seconds to move the hydraulic cylinder sufficiently to compact the $CO_2$ snow, extrude dry ice pellets, and retract the piston head from the extrusion chamber). These time requirements are due in part to delays in crystal particle formation due to inadequate gas venting, delays due to compaction inefficiencies, and delays due to slow transfer of hydraulic fluid during the charging and exhaustion stages of the hydraulic cylinder 56. At approximately 7–8 lbs of dry ice pellets 52 produced per cycle, single path extruder 40 can produce a maximum of 120 lbs dry ice pellets each hour.

Second, carbon dioxide gas produced during the $CO_2$ snow formation is discharged through vent holes limited to the top of the surface compaction/extrusion cylinder. However, since approximately 1.5 lbs of $CO_2$ gas is formed for each 1 lb of $CO_2$ snow, the small planar vent area reduces $CO_2$ snow production substantially. Moreover, a metal screen having 5-micron sized holes needed to be placed over the vent holes on the extrusion cylinder to contain the $CO_2$ snow in the compaction/extrusion cylinder during the compaction stage. These vent holes frequently clogged with $CO_2$ snow, thereby further limiting venting of $CO_2$ gas, and the consequent amount of $CO_2$ snow that can be formed in the cylinder.

Third, the Tomco extruder 40 uses a die plate 70 shown in more detail in FIG. 3, having tapered holes 72 conically drilled therethrough. While this configuration further compacts the $CO_2$ snow as it is pushed through the holes 72 during the extrusion stage to further increase the density of the resulting dry ice pellets, it is very expensive to drill conical holes through a 1½-inch thick metal die plate. This expense is compounded by the need for a minimum of 50% net open area across a 3¼-inch diameter die plate 70 to produce the resulting 120 lbs dry ice per hour.

Fourth, the single path extruder 40 still requires tie rods 59 and 60 to accomplish precision alignment of hydraulic cylinder 56, web plate 54, and extrusion housing 42, using long wrenches to apply the required 100 ft-lbs of torque to the tie rods, because of the large size and weight of the components. This assembly process is cumbersome, and poses safety risks if a tie rod should break under such extreme pressures.

While the 120 lbs/hr production capacity of the Tomco extruder 40 is far less than the 1000 lbs/hr production rate of the Liquid Carbonics extruder 10, it is achieved with a far smaller machine that is more portable. Efforts have been made by Tomco, however, to scale up the components in its linear path, sequential extruder 40 to achieve higher dry ice pellet production rates. For example, an extrusion chamber having a 6-inch diameter bore and piston head has been combined with a massive hydraulic cylinder with a 24-inch stroke. Using 1-inch diameter tie rods under 650 ft-lbs of torque to align the hydraulic cylinder, web plate, and extrusion housing, as well as a 1½-inch thick die plate, 480–500 lbs/hr of food processing grade dry ice pellets have been obtained. In order to achieve the same enhanced production rate of the denser, sandblasting grade pellets, however, an 8-inch diameter extrusion chamber and piston head were needed in combination with a 24-inch-stroke hydraulic cylinder, 2-inch-thick die plate, and 1¼-inch tie rods at 1350 ft-lbs of torque.

It will be readily appreciated that such efforts to increase production rates through a mere increase in component size produces many disadvantages. Because of the extremely large size of the resulting overall extruder system, the Tomco 6-inch-diameter extruder weighs 4500 lbs and is powered with a stationary electrically wired motor, thereby making it impossible to use it in the field where portability is key. The 8-inch-diameter Tomco extruder for sandblasting grade dry ice pellets is even heavier. Moreover, the amount of torque that must be applied to the tie rods is extraordinary. The 650 ft-lbs needed for Tomco's 6-inch diameter extruder is applied using a 66-inch-long wrench. At 1350 ft-lbs for Tomco's 8-inch-diameter extruder, the wrench and the consequent effort by and danger to a maintenance employee is even greater. Furthermore, the 1½ to 2-inch-thick die plates greatly increase machining costs. Finally, separate extruders are required to produce sandblasting and food process grade pellets. Thus, 480–500 lbs/hr of dry ice production by Tomco's scaled-up extruder comes at a price.

Other examples of single path, linear, sequential pellet extruders are disclosed in U.S. Pat. Nos. 3,576,112; 3,618,330; 3,708,993; and 4,780,119. Each of these products suffer from the same problems noted above relative to the Tomco extruder.

Efforts have also been made in the trade to extrude dry ice pellets without a piston head operated by a hydraulic cylinder. For instance, in U.S. Pat. No. 4,389,820 issued to Fong et al., $CO_2$ snow formed in a snow chamber is forced by orbiting rollers through an annular, donut-shaped die, having radially extending holes through its circumference. Pins extending partially across the path of the die holes help to direct the extruded $CO_2$ snow, and break them off into dry ice pellets of predetermined length. U.S. Pat. No. 4,977,910 issued to Miyahara et al. similarly discusses the use of a rotating barrel positioned inside an outer barrel with die holes along its perimeter to force $CO_2$ snow through the holes to produce dry ice pellets. U.S. Pat. No. 4,033,736 issued to Cann uses rotary means to force $CO_2$ snow into an extrusion chamber against opposed forces applied by springs to extrude dry ice pellets, while stabilizing them as additional $CO_2$ gas is emitted. Finally, U.S. Pat. No. 3,670,516 issued to Duron et al. discloses a rotary extruder in which $CO_2$ snow is compacted between cooperating teeth along the perimeter of a circular die ring and rotating gear pinions, and then forced through draw holes located in the die ring to extrude dry ice pellets.

However, it is believed that such rotary driven extruders are much more complicated to build, operate, and maintain due to the large number of intricate parts.

As has been noted, in many applications for dry ice pellets, it would be beneficial to use a feed exceeding 500 lbs of dry ice pellets per hour. Conventional equipment manufacturers attempted such a goal by combining two of its 6-inch diameter extruders out of phase to produce one overall machine producing approximately 1000 lbs/hr of food processing-grade dry ice pellets. Operation of the respective hydraulic cylinders were coordinated so that while $CO_2$ snow was being formed in one compaction/extrusion chamber, $CO_2$ snow was being compacted and extruded in the other chamber. While such an arrangement provided, in theory, nearly two cycles per minute, and therefore 1000 lbs/hr of dry ice pellets, the machine weighed 6500 lbs, and required complex measures to mechanically integrate and control the functions of each 6-inch extruder barrel in a cooperative relationship.

In summary, conventional dry ice machines are sized to accommodate the rate of snow formation, gaseous $CO_2$ removal, snow compaction and extrusion. The rate of snow formation is dependent on the rate; therefore, the amount of gaseous $CO_2$ removed from the transformation reaction. In this regard, prior art machines suffer from a deficiency in the rate of removal of gaseous $CO_2$ from the chamber, which contains and separates the snow from the gas. For example, in such prior devices, approximately one and one-half (1½) pounds of gaseous $CO_2$ must be separated and removed for one (1) pound of snow production.

One manufacturer of conventional machines, drills two hundred twenty-six (226) holes that are 0.201 inches in diameter in a one-half (½) inch thick steel tube that serves as the collection, compaction and extrusion chamber for a dry ice pelletizer. A fine mesh screen covers the drilled holes. This configuration results in a net open surface area of nine and one-half percent (9.5%) but is incapable of providing sufficiently rapid production rates for optimal commercial acceptance.

Sintered metal filters have been proposed in the patent literature (e.g., see U.S. Pat. No. 3,576,112 to Frost and U.S. Pat. No. 3,618,330 to Hardt et al) for use in filtering and separating gaseous $CO_2$ from snow in dry ice pelletizing machines. However, such sintered metal filters have not been incorporated in commercially successful machines because of blinding or blockage deficiencies and breakage due to embrittlement at low transformation temperatures.

It is believed that the problems encountered in using sintered metals as filter media for venting dry ice pelletizers is due to the single grade metal particles employed and the uniform particle size and the distribution of particles utilized in preparing such sintered materials. In this regard, it is to be noted that conventional sintered metals are formed in a manner such that uniformly straight and consistent air passageways are distributed throughout the surface of the material. No accommodation is made for configuring the passageways in tortuous or irregularly shaped fashion.

In view of the construction of the prior art machines and, in particular, the composition and configuration of the filter media employed therein for venting the extrusion chamber, the efficiency of manufacture and the rate of production of dry ice particles utilizing these machines has been adversely impacted.

SUMMARY OF THE INVENTION

Accordingly, it is a principal object of the present invention to provide machines and processes for enabling significantly increased production capacity in the manufacture of solid forms of dry ice (carbon dioxide) from crystal particles or "snow" when liquefied carbon dioxide ($CO_2$) is transformed into snow and gaseous $CO_2$ and the snow is compacted and extruded into solid forms. In this regard, it is a specific object of the present invention to overcome the deficiencies experienced with heretofore conventional machines that utilize drilled hole passageway filters in steel plate and/or sintered metal filters to separate the snow and remove the gaseous $CO_2$ from dry ice machines.

Another specific object of the present invention is to provide a new and improved pelletizer machine that can significantly increase the production capacity generated from conventional machines of the same size and power consumption.

Another specific object of the present invention is to provide a dry ice pellet extruding device having a single extrusion chamber which is capable of providing 6–10 extrusion cycles per minute, and 1000 lbs/hr of dry ice pellets.

Another object of the present invention is to provide an extruder device that performs the liquid $CO_2$ injection, $CO_2$ snow formation, $CO_2$ gas ventilation, $CO_2$ snow compaction, and dry ice pellet extrusion functions simultaneously, instead of sequentially.

Yet another object of the present invention is to provide an extruder device that compacts $CO_2$ snow to form pre-extruded cartridges or other mechanically compacted solid forms having an increased density of 45–80%.

A further object of the present invention is to provide such an extruder device having electronic controls for synchronizing the simultaneous operations.

Another object of the present invention is to provide such an extruder device having at least twice the venting surface area and filter medium, compared with conventional extruders.

A still further object of the present invention is to provide a filter cartridge for such an extruder device, having a selected wall thickness, inside diameter, pore size, and pore distribution for venting $CO_2$ gas from the $CO_2$ snow formation chamber, while containing substantially all of the $CO_2$ snow particles therein.

Another object of the present invention is to provide such an extruder device that improves extrusion cycle times by using a novel bi-directional internal regeneration hydraulic cylinder and/or directional flow controls that have the capacity to charge and exhaust the hydraulic cylinder fluid 6–10 times faster than conventional cylinders and/or controls.

Another object of the present invention is to provide such an extruder device that uses a taper plate and die plate combination, wherein the die plate is thinner than and has a smaller hole pattern diameter than that for conventional die plates.

Yet another object of the present invention is to provide such an extruder device that is of a reduced size and weight when compared with conventional dry ice pellet extruders, and can be powered with a conventional, stationery electrical energy source or with a non-stationary internal combustion engine energy source for enhanced portability.

Still another object of the present invention is to provide such an extruder device that dispenses with web plate/tie rod assemblies and close couples the extruder components instead to ensure proper alignment therebetween.

Yet another object of the present invention is to provide such a device that manufacture unextruded compacted dry ice solids, or remanufactures partially sublimated dry ice solids into extruded dry ice pellets of a predetermined size and shape.

Other objects of the invention, in addition to those set forth above, will become apparent to those skilled in the art from the following disclosure.

Briefly, the present invention is directed to new and improved dry ice pelletizing apparatus that incorporates a filter comprising a sintered plastic porous medium having an irregular and nonuniform distribution of plastic particles therein. This filter media provides a plurality of tortuous and irregularly shaped air passages running therethrough for purposes of venting $CO_2$ gas from a $CO_2$ snow formation chamber in the apparatus. As a result of this construction, it has been found that the apparatus is able to significantly increase the production capacity relative to conventional machines of the same size and power consumption.

Preferably, the filter media to be employed in the present apparatus comprises a mixture of various polymeric constituents such as blends of polymers having irregular distribution and nonuniform particle size. In this regard, a single polymeric constituent of varying particle size and shape may be employed as well as multiple polymer blends which incorporate two or more distinct polymeric constituents capable of providing a tortuous and irregularly shaped path through the resulting structure. Exemplary of suitable polymers for use herein are fluorinated copolymers that retain flexiblity and wear properties at temperatures of about $-109°$ F.

In a most preferred embodiment of this invention, the filter media for use in the apparatus comprises a binary blend of larger size particles of high density polyethylene that remain flexible at the transformation temperature of carbon dioxide (CO2) and a fine particle, ultra-high molecular weight polyethylene that is essentially rigid at such transformation temperature. The resulting sintered product has an irregular pore and passageway distribution that prevents blinding or blockage over an extended period of operation. The net gas void fraction of the preferred two (2) component sintered plastic media is forty percent (40%) to forty-five percent (45%). The preferred sintered plastic media has an eighty (80) to one hundred forty (140) micron porosity. The preferred thickness of the sintered plastic filter media is one-fourth (¼) inch. The thickness can vary from one sixteenth (1/16) to one and one-fourth (1¼) inches. The most preferred two component sintered plastic media for use in this invention are manufactured and sold as proprietary blends by Porex Technologies, Inc. under the product designation 4905 and 4907.

The apparatus of this invention employing the required filter media for venting the carbon dioxide (CO2) gas from the snow formation chamber enables conversion of pressurized liquid $CO_2$ feed into dry ice pellets of predetermined shape and size, in a manner such that $CO_2$ snow formation, $CO_2$ snow compaction, and dry ice pellet extrusion phases occur simultaneously resulting in production rates on the order of 700–1000 lbs/hr. The compacted $CO_2$ snow may be in the form of a solid cartridge or irregularly shaped solids, and such compacted particles may constitute an end product by themselves.

The increased production rates are achieved by enhanced removal of $CO_2$ gas from the $CO_2$ snow formation chamber, and use of a bidirectional internal regeneration cylinder to provide compactive force. The extruder is portable, since it only weighs approximately 1000 lbs, and may be used to remanufacture partially sublimated dry ice solids into extruded dry ice pellets of a predetermined shape and size.

DETAILED DESCRIPTION OF THE PREFERRED EMBODIMENT

Figure 4:
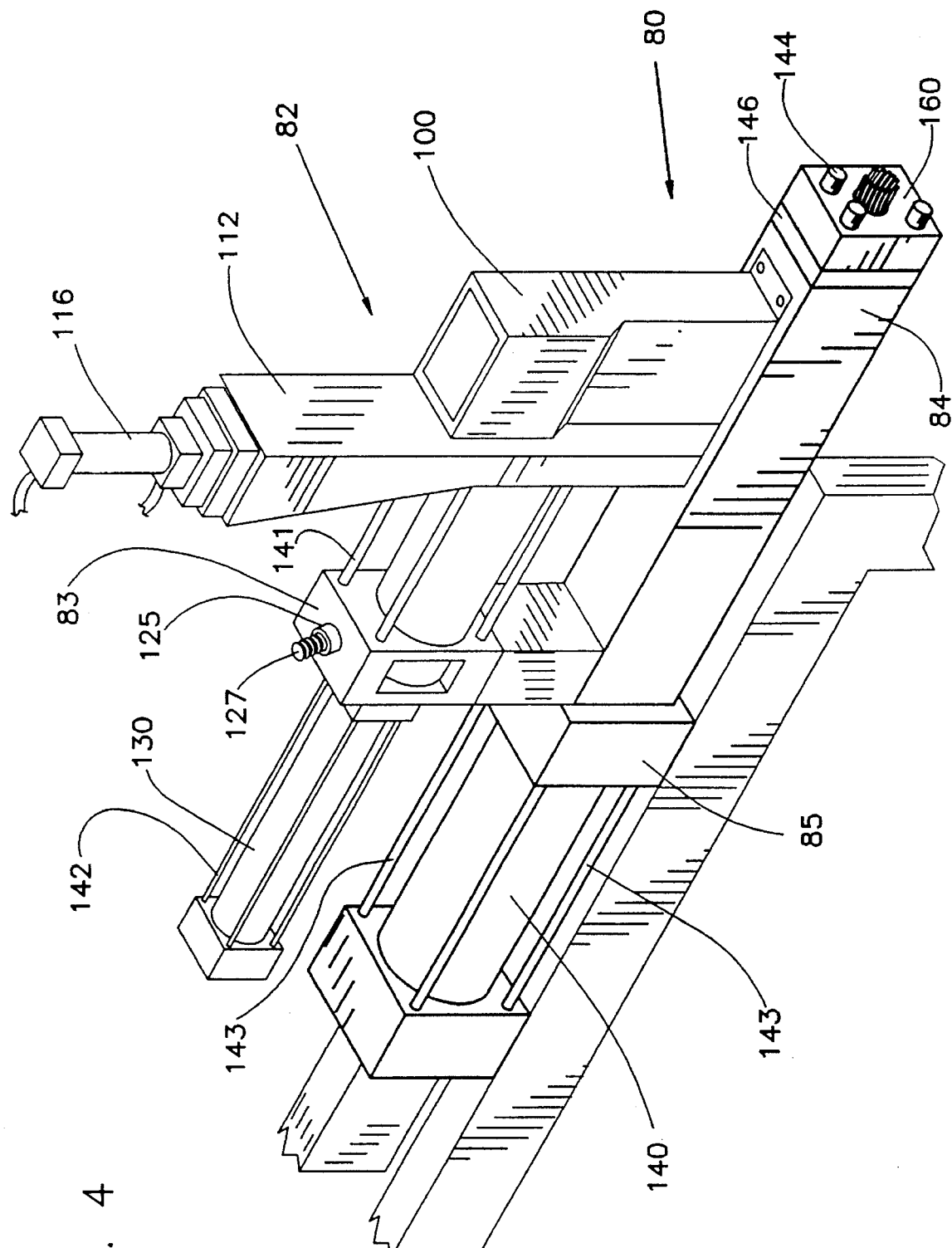
FIG. 4 is a perspective view of the dry ice pellet extruder of the present invention.
Figure 5:
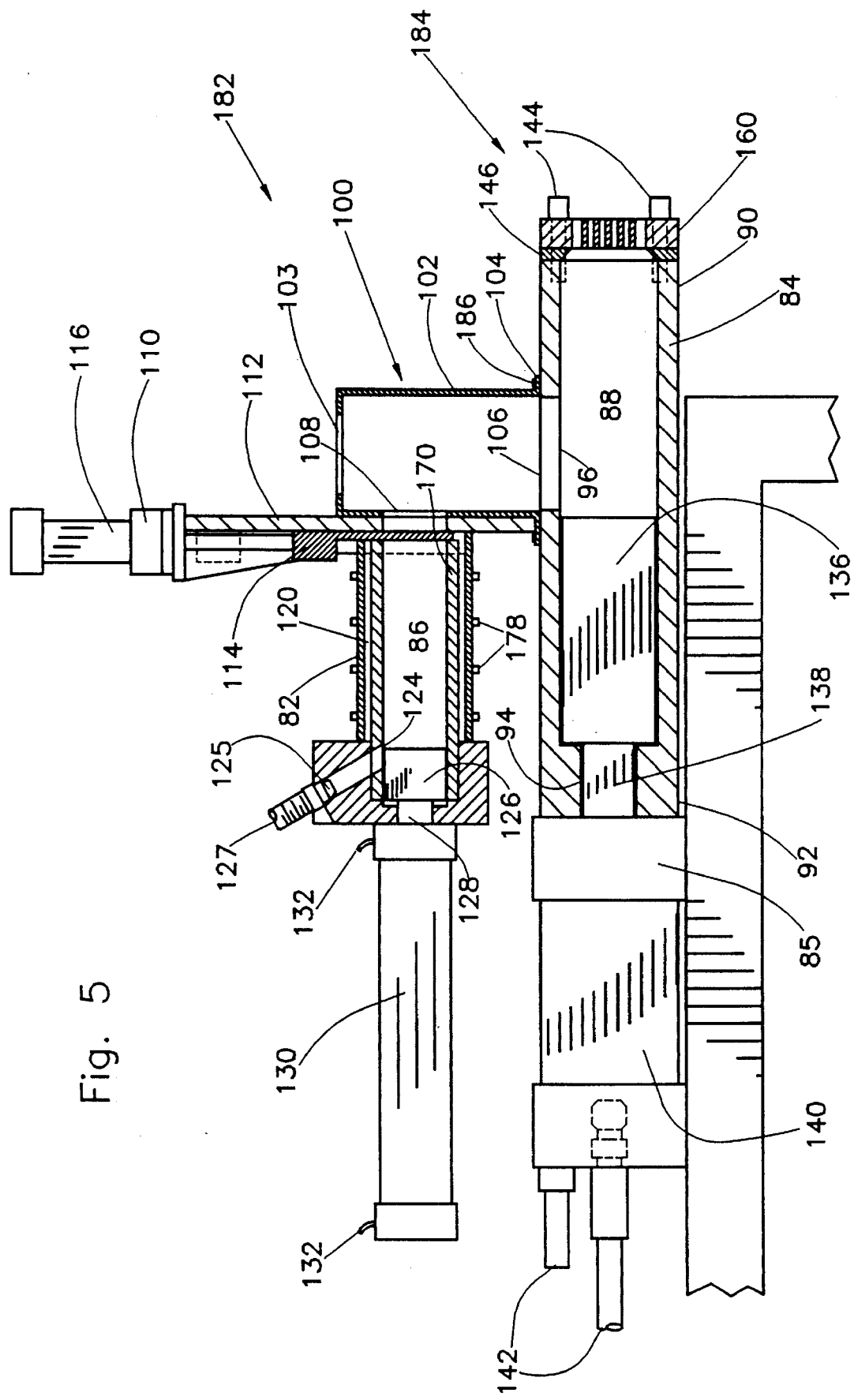
FIG. 5 is a side sectional view of the dry ice pellet extruder shown in FIG. 4.

As illustrated in FIGS. 4–5, the dry ice pellet extruder 80 of the present invention comprises two separate housings 82 and 84. Housing 84 has a square cross section. Located inside it is cylindrical chamber 88 having a circular cross section, preferably 1¼ to 3 ¼ inches in diameter while the downstream end 90 is open, the upstream end 92 is closed except for a cylindrical bore 94. Located along the top surface of housing 84 is opening 96, providing entry into extrusion chamber 88.

Feed mechanism 100 comprises a housing 102, whose side walls terminate in collar 104 surrounding an outlet port 106. Housing 102 is secured to extrusion housing 84 by means of bolts 186 or some other suitable fastening means. Inlet port 108 is located in a side wall of housing 102.

Connected to feed mechanism 100 and in communication with inlet port 108 is actuator mechanism 110. It comprises housing 112 inside of which is positioned reciprocating gate barrier 114 to which is operatively connected actuator mechanism 116. Although actuator mechanism 116 may consist of a hydraulic cylinder, it has been found that an air-actuated piston operated by pressure supplied by a $CO_2$ gas cylinder is sufficient to reciprocate barrier gate 114 between the up and down positions.

Mounted to actuator mechanism 110, and positioned roughly parallel with extrusion housing 84 is housing 82 which has a cylindrical internal bore 120. Positioned inside internal bore 120 is an open-ended filter cartridge 170, preferably 2½ inches in diameter; which will be described shortly. Carbon dioxide snow is formed within chamber 86 defined by filter cartridge 170. Inlet port 124 accepts nozzle 125 for introducing liquid $CO_2$ to chamber 86.

Piston head 126 is reciprocated inside chamber 86 by means of shaft 128 operated by hydraulic cylinder 130 with a 10-inch stroke. Hoses 132 deliver hydraulic fluid to either end of hydraulic cylinder 130 to operate it in a conventional manner.

Piston head 136 is permanently positioned inside extrusion chamber 88. In its retracted position, it does not block extrusion inlet port 96. Integrally connected to piston head 136 is piston rod 138 that reciprocates through bore 94 in the end wall of housing 84. Piston rod 138 is operated by hydraulic cylinder 140, having a an 8-inch stroke. Hoses 142 deliver hydraulic fluid to either end of hydraulic cylinder 140.

Mounted to the downstream end 90 of extrusion housing 84 by means of ⅞-inch bolts 144 under 250 ft-lbs of torque is taper plate 146. Shown in greater detail in FIG. 6, it comprises a flat plate 148 with throughholes 150 around its perimeter for accepting bolts 144. Opening 152 is drilled through plate 148 with a conical cross section. For example, while the diameter of the opening along the upstream face 154 of plate 148 might be the same 3¼-inches as the internal diameter of extrusion chamber 88, the opening diameter at the downstream face 156 might be reduced to only 2½-inches by means of tapered walls 158.

Figure 7:
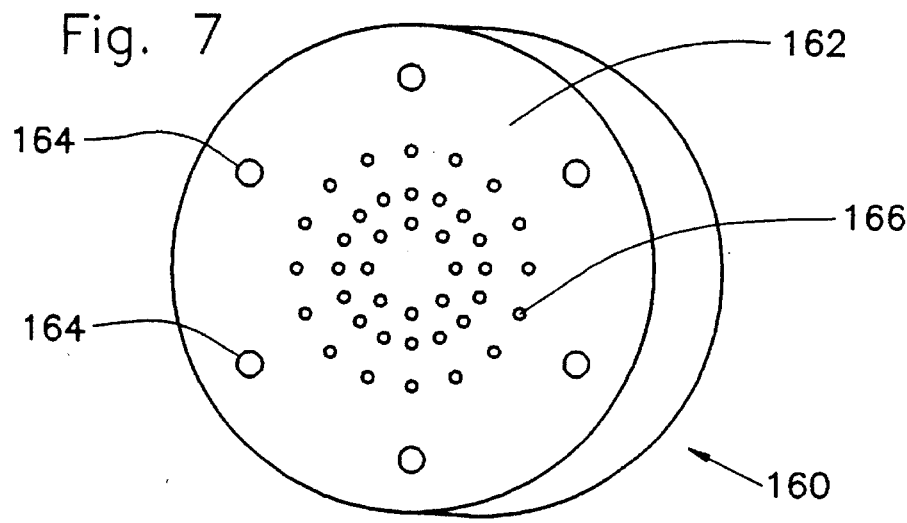
FIG. 7 is a perspective view of the die plate for the dry ice pellet extruder of the present invention.

Extrusion die plate 160 is shown more clearly in FIG. 7. It comprises a simple plate 162 having through holes 164 for accepting bolts 144. A plurality of passageways 166 are drilled in an area in the center of die plate 160 that has a diameter less than that along the downstream face 156 of taper plate 146. These passageways 166 preferably are rectangular in cross section without any taper to the walls. Die plate 160 is preferably ½-inch thick, and has 700 passageways drilled covering approximately 65–70% of its face area. Only 55–60% of the face area of conventional die plates account for passageways, so the increased area for the die plate 160 of the present invention allows a thinner die plate because lower extrusion forces are generally applied due to decreased resistance. It should be understood that the diameter of passageways 166 may be varied between 0.04 inches and 1.0 inch, depending upon the desired diameter of the dry ice pellets to be extruded.

Figure 8:
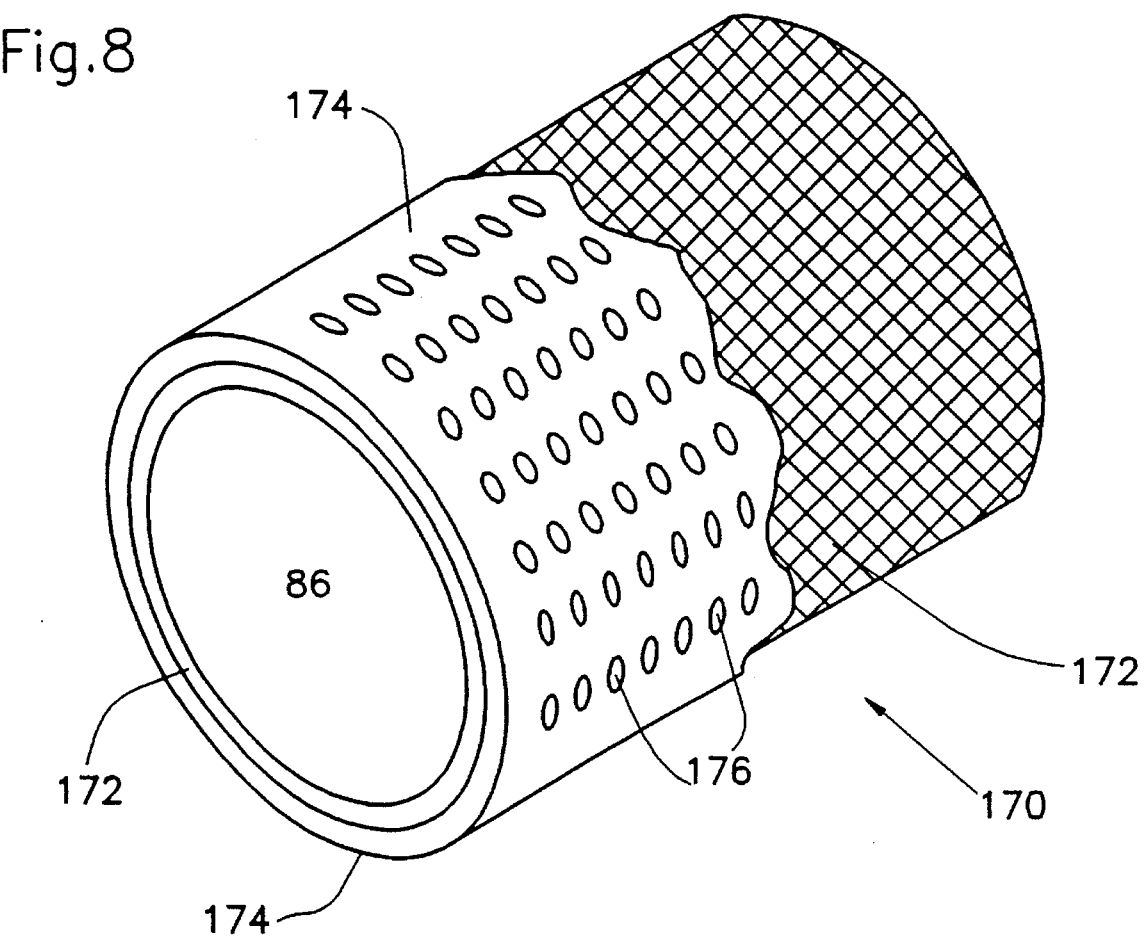
FIG. 8 is a perspective, partially cut-away view of the filter cartridge for the dry ice pellet extruder of the present invention.

Filter cartridge 170 is shown in greater detail in FIG. 8. It comprises a cylindrical element 172 made from sintered plastic, a process by which blends of plastic particles of varying size, shape and distribution are placed in a mold and heated to a plasticized state and then cooled so that a solid material is made having tortuous and irregularly shaped air passages between the particles.

Porous plastic sintered media are usually mixtures of various types of polymers, the precise composition of which are maintained as proprietary to the fabricating company. Such products normally have particle sizes of 50–250 screen mesh. Polymers used for producing such sintered plastic media include, but are not limited to, polyethylene, polypropylene, fluorinated polymers and elastomeric polymers. Porosity of the fabricated sintered media is variable and non-uniform as a result of multi-model and uneven distribution of particles in the media mixtures.

Examples of proprietary formulations which have been found to be advantageous for use as filter media in the pelletizers of the present invention are products manufactured and sold by Porex Technologies, Inc. under the product designations 4905 and 4907. The 4905 and 4907 products are formulated from high density polyethylene (HDPE) and variable amounts of ultra high molecular weight polyethylene (UHMW). HDPE particles used for sintering are a larger screen mesh size than UHMW particles. Product 4907 is primarily composed of HDPE particles with a small amount of UHMW particles and has a porosity range of 80–140 microns. Product 4905 is composed of HDPE particles and less than 50% UHMW particles and has a porosity range of 40–90 microns. HDPE is flexible at −109° F. and UHMW is rigid.

In general, it should be noted that sintered plastics are usually fabricated from mixtures of particles to achieve uneven distribution in the finished product. Mixtures of particles with uneven distribution and with variable physical properties results in a finished product having irregular, non-uniform, tortuous passageways therein.

Sintered plastic filter element 172 defines $CO_2$ snow formation/compaction chamber 86 previously discussed. It can withstand 150–250 psig of pressure, compared with the mere 50 psig that the 5 μm metal screen of the Tomco extruder could withstand. Although piston head 126 only exerts an average 1200 psig pressure in compaction chamber 86, this still exceeds the 150–250 psig limit of sintered plastic filter element 172. Therefore, a perforated metal jacket 174 having a plurality of holes 176 in the surface thereof provides a structural support for sintered plastic filter element 172, while providing holes 176 to permit $CO_2$ gas passing through the wall of sintered plastic filter element 172 to pass likewise through support jacket 174 to collect in annular region 120. Vent ports 178 located along housing wall 82 enable the collected $CO_2$ gas to be exhausted to the atmosphere. The 1200 psig compaction chamber pressure is far less than the 3200 psig pressure of the single compaction/ extrusion chamber of the prior art.

It will be appreciated that the filter cartridge 170 of the present invention provides a full 360° of venting area along the entire length of the cartridge, unlike the prior art dry ice extruder devices that only provided a narrow vent area along the top of the extrusion chamber in which the $CO_2$ snow is formed. By substantially increasing the venting area for exhaustion of $CO_2$ gas formed in chamber 86 during the transformation of liquid $CO_2$ to $CO_2$ snow, the production rate of the $CO_2$ snow is greatly increased, because of the removal of the $CO_2$ gas. At the same time, the tortuous paths between particles in sintered plastic filter element 172 of filter cartridge 170 prevents solid $CO_2$ snow particles from passing through the filter cartridge to clog up $CO_2$ gas collection annulus 120 that would reduce the collection rate of $CO_2$ snow in chamber 86. The prior art Tomco machines did not employ a filter material, let alone one made from sintered plastic, so a metal screen having 5 μm holes needed to be placed over the vent holes to prevent $CO_2$ snow from passing therethrough. The operating pressure for the metal screen was limited to 50 psig. However, these holes easily became clogged with $CO_2$ snow and ice, thereby impeding passage of $CO_2$ gas. Because the tortuous paths through the sintered plastic filter element 172 of the present invention prevents $CO_2$ snow passage, holes 176 may be sized much larger on the order of 10–250 μm to ensure easy passage of the $CO_2$ gas. The pore size and distribution of sintered plastic filter element 172 may be selected to optimize the passage of $CO_2$ gas along with the impedance of $CO_2$ snow.

Operation of pellet-making machine 80 will now be described. Liquid $CO_2$ is injected into chamber 86 through hose 127 and nozzle 125. Upon coming into contact with the atmospheric pressure condition in chamber 86, the triple point is reached, and the $CO_2$ liquid is transformed into a large mass of $CO_2$ snow accompanied by a large volume of $CO_2$ gas. The $CO_2$ gas is venting through the tortuous paths of the 360° sintered plastic filter element 172 and through holes 176 in metal support jacket 174, whereupon it is collected in annular vapor chamber 120. This $CO_2$ gas is then vented to the atmosphere through outlet vents 178.

Figure 9:
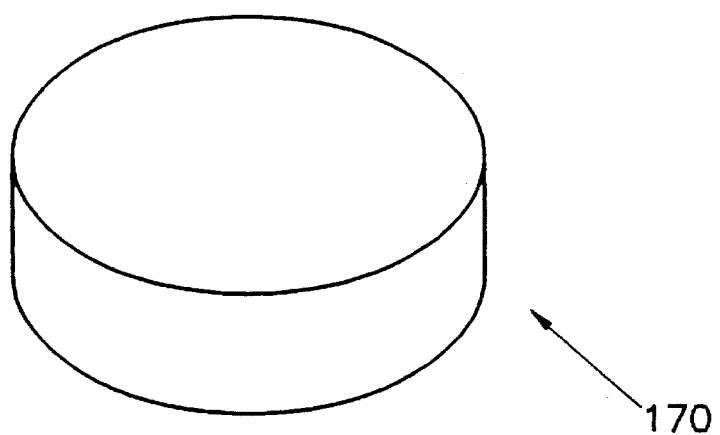
FIG. 9 is a perspective view of a $CO_2$ snow cartridge formed by the dry ice pellet extruder of the present invention.

Meanwhile, the large mass of $CO_2$ snow formed in chamber 86 is rammed against barrier gate 114 by means of piston head 126 advanced into chamber 86 by piston rod 128 and hydraulic cylinder 130 to form a compacted $CO_2$ snow cartridge 180 shown in FIG. 9. Air actuator 110 powered by air actuator mechanism 116 lifts barrier gate 114 while piston head 126 is still advancing into chamber 86 so that $CO_2$ snow cartridge 180 is pushed through inlet port 108 into feed mechanism 100, whereupon it falls by means of gravity through outlet port 106 into extrusion chamber 88.

Piston head 136 is advanced into extrusion chamber 88 by means of piston rod 138 and hydraulic cylinder 140 to further compact $CO_2$ snow cartridge 180 against taper plate 146. The cartridge having an enhanced density is then rammed through holes 164 in die plate 160 to extrude dry ice pellets having a predetermined diameter and length.

It will be appreciated that since the $CO_2$ snow formation/ compaction and dry ice extrusion functions occur in different chambers (i.e., chambers 86 and 88, respectively) they may take place simultaneously in order to maximize production of dry ice pellets. This overcomes the substantial limitation inherent in the linear path pellet extruders of the prior art in which the $CO_2$ snow formation, compaction, and dry ice extrusion steps occur sequentially to limit the machine to one cycle per minute. By contrast, the pellet extruder 80 of the present invention can operate at 6–10 cycles per minute, and produce approximately 500 pounds of dry ice pellets each hour using a much smaller and more portable machine.

Because only 1200 psig of pressure is required to compact $CO_2$ snow, as opposed to the 3200 psig required to extrude ice blasting-grade dry ice pellets (2200–2500 psig to extrude food processing-grade pellets), these functions are conveniently separated in compaction chamber 86 and extrusion chamber 88. Indeed, it takes less time and stroke to reciprocate a 1200 psig piston, so the compaction function is speeded up. Therefore, the tie rods 141 shown in FIG. 4 are used merely to secure the parts of compaction chamber assembly due to the different geometries of cylindrical housing 82 and rectangularly shaped end block 83 and actuator housing 112, rather than any need to avoid misalignment of piston head 126 and compaction chamber 86 during reciprocated movement of the piston head 126 by hydraulic cylinder 130.

Although conventional 3200 psig pressures are exerted within extrusion chamber 88 by hydraulic cylinder 140 and piston head 136, tie rods are likewise unnecessary to hold end block 85, housing wall 84, and taper plate 146 and die plate 160 together in precise alignment, because the unique, square cross-sectional profile of housing 84 enables its ends to be secured to end block 85 and taper plate 146 and die plate 160 by simple bolts. While tie rods 142 and 143 appear on hydraulic cylinders 130 and 140, respectively, these are off-the-shelf components, and the hydraulic cylinders are close coupled directly to the compaction and extrusion chamber assemblies by means of bolts, thereby completely eliminating the web plates and tie rods of prior art extruders. This also serves to reduce the weight of extruder 80, which only weighs 1000 lbs, compared with the 4500 lbs of the 6-inch diameter extruder of the prior art. Because of its substantially lower weight, it is much easier to move, and therefore more portable in the field.

Therefore, the enhanced 500 lbs/hr production rate of extruder 80 of the present invention is due to: the simultaneous $CO_2$ snow formation/compaction/dry ice extrusion functions; the 360° cylindrical filter cartridge 170 that greatly increases the capacity of the extruder to vent $CO_2$ gas; taper plate 146 that further compacts the $CO_2$ snow cartridge 170 to achieve enhanced densities before it reaches die plate 160; and the close coupling of hydraulic cylinders 130 and 140 to compaction and extrusion chambers 86 and 88, respectively, that reduces the size of the hydraulic cylinders and speeds up their reciprocal movement.

Because there is a market in the food processing industry for the $CO_2$ snow cartridge 170, itself, the upper assembly 182 comprising hydraulic cylinder 130, $CO_2$ snow formation/compaction housing 82, actuator mechanism 110, and feed mechanism 100 may readily be removed from lower assembly 184, comprising hydraulic cylinder 140, extrusion housing 84, taper plate 146, and die plate 160 by means of bolts 186. In this manner, $CO_2$ snow cartridges 170 may be quickly and expeditiously made by upper assembly 182 without the need to extrude them.

Entry port 103 in the top of feed mechanism 100 permits left over dry ice pellets from a previous run of pellet extruder 80 to be added by hand or other mechanical method to feed mechanism 100 and, therefore, extrusion chamber 88 to remanufacture them as new pellets. Hence, waste of dry ice pellets that lose hardness through partial sublimation over time outside extruder 80 is substantially reduced.

Figure 10:
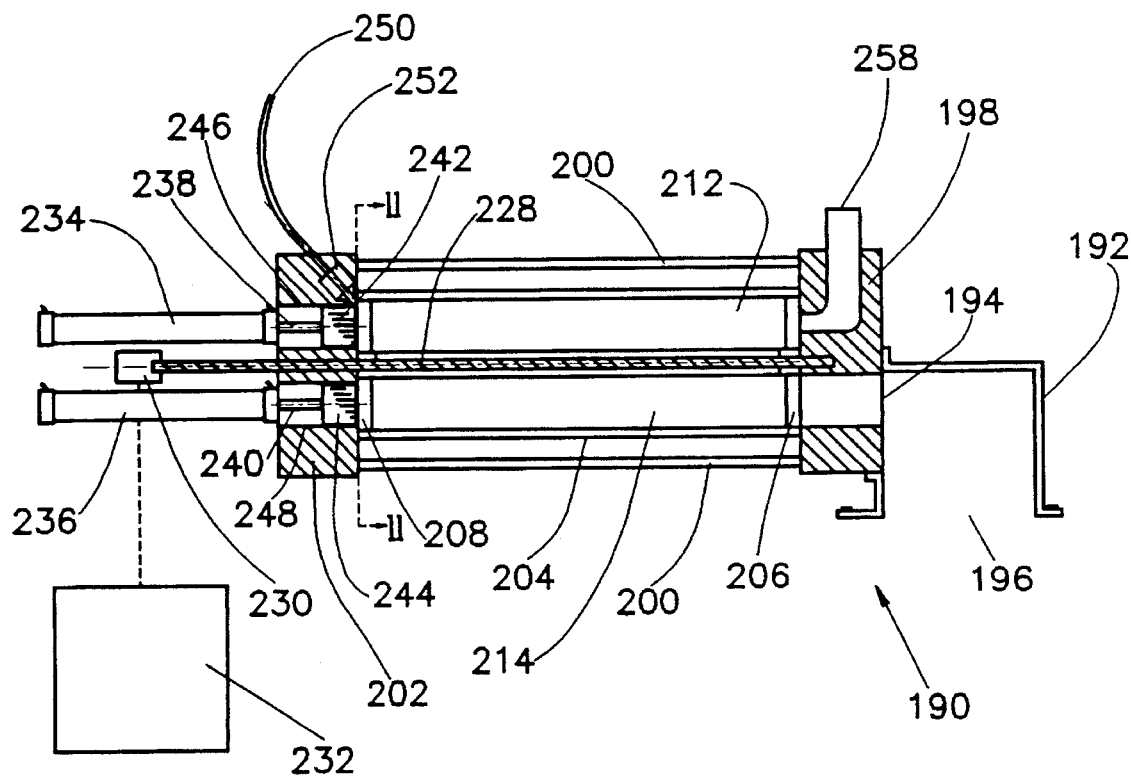
FIG. 10 is a side sectional view of a second embodiment of a $CO_2$ snow-formation compaction unit of the dry ice pellet extruder of the present invention.
Figure 11:
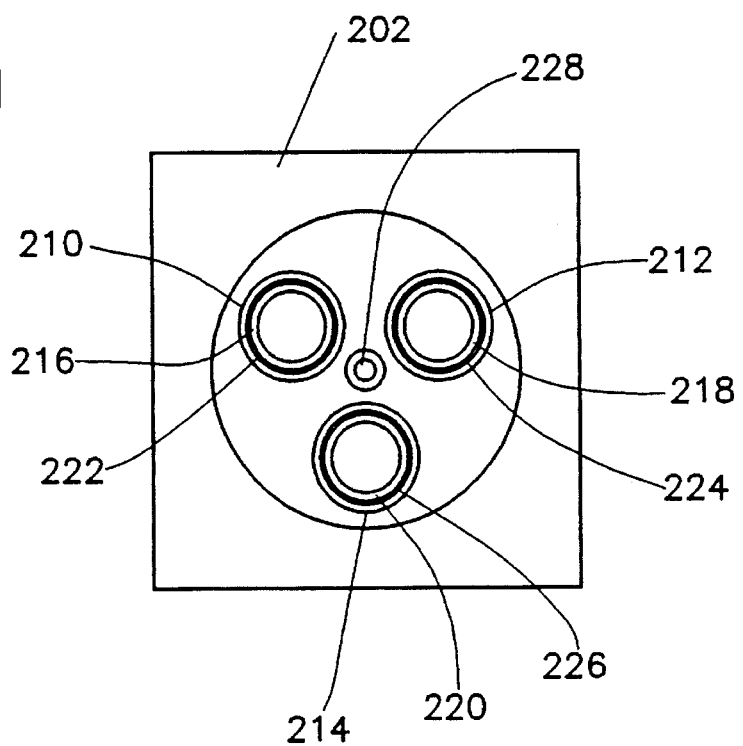
FIG. 11 is an end view of FIG. 10 taken along line 11—11.

Another embodiment of the invention is shown in FIGS. 10–11. While lower assembly 184 remains unchanged, upper assembly 190 comprises a feed mechanism 192 having an inlet port 194 and outlet port 196. To it is attached end stationary block 198 to which is attached end block 202 by means of tie rods 200. Within the support provided by end blocks 198 and 202 is secured rotating carousel 204, comprising end plates 206 and 208, and chamber assemblies 210, 212, and 214. Each one of the chamber assemblies comprises, in turn, sintered plastic filter elements 216, 218, and 220, as well as a perforated metal support jacket 222, 224, and 226, respectively, as previously described. Drive shaft 228 is used to rotate carousel 204, and is operated by gear transmission 230, and motor 232.

To end block 202 are attached hydraulic cylinders 234 and 236, which in turn operate piston shafts 238 and 240, and piston heads 242 and 244 that pass through channels 246 and 248 in end block 202 to enter chamber assemblies 210, 212 or 214. Finally, liquid $CO_2$ hose 250 and nozzle 252 penetrate end block 202, and $CO_2$ gas vent 258 is located in end block 198.

During operation of upper assembly 190, liquid $CO_2$ is injected into one of the chamber assemblies (for example chamber assembly 210) to form $CO_2$ snow and $CO_2$ gas. The $CO_2$ gas is expelled through the tortuous passages in sintered plastic filter element 216 and the holes in perforated metal support jacket 224 to be exhausted to the environment through vent 258.

Meanwhile, $CO_2$ snow formed in sintered plastic filter element 218 of chamber assembly 212 is compacted by means of piston head 242 operated by hydraulic cylinder 234 to produce a $CO_2$ snow cartridge like the one illustrated in FIG. 9. At the same time, a similar $CO_2$ snow cartridge in sintered plastic filter element 220 of chamber assembly 214 is pushed by hydraulic cylinder 236 and piston head 244 through inlet port 194 into feed mechanism housing 192 in which it drops by means of gravity through outlet port 196 into the extruder chamber 88 of lower assembly 184. By turning carousel 204 between these three positions, $CO_2$ snow formation, compaction, and cartridge ejection operations may occur simultaneously in chambers 210, 212, and 214 to further enhance the production rate of the dry ice pellets from the extruder. In such an arrangement, the sole limitation on the dry ice pelletizing capacity of the extruder is the speed of hydraulic cylinder 140 for the extrusion function.

Figure 1:
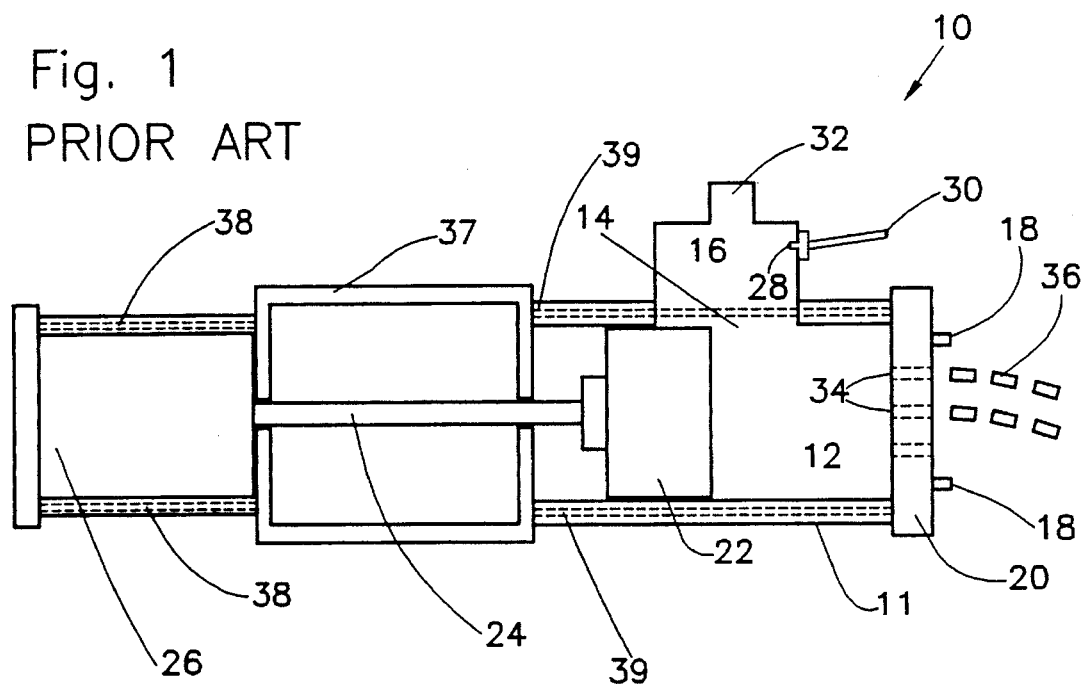
FIG. 1 is a side sectional schematic view of a dry ice pellet extruder of the prior art as commercialized by Liquid Carbonic Corporation.
Figure 2:
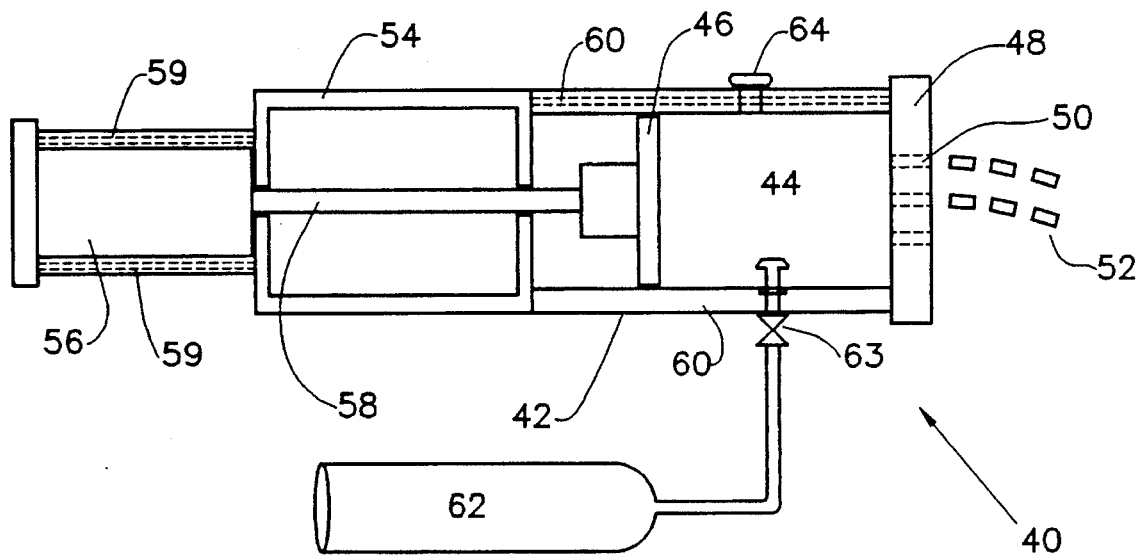
FIG. 2 is a side sectional schematic view of another dry ice pellet extruder of the prior art.
Figure 3:
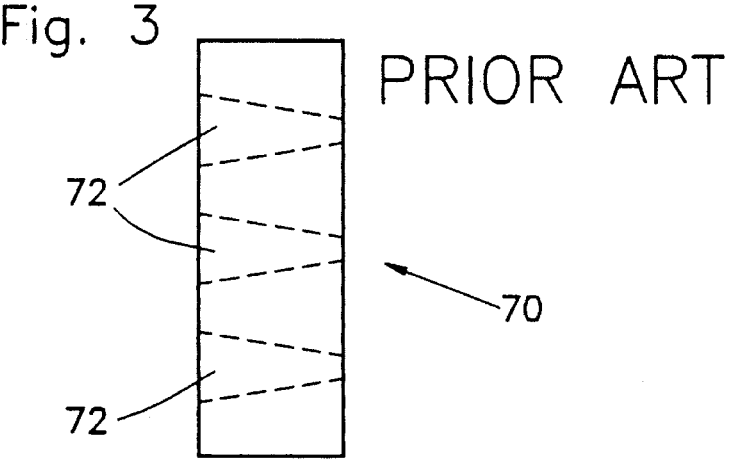
FIG. 3 is a side view of a die plate of the prior art.
Figure 6:
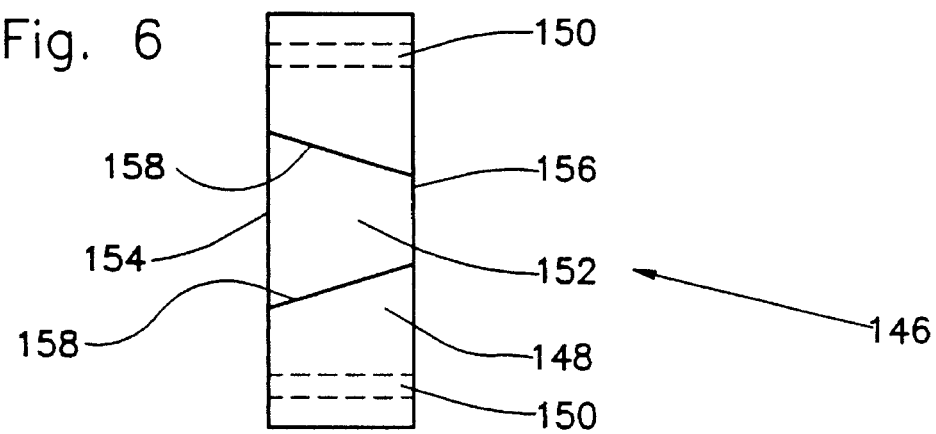
FIG. 6 is a side view of the taper plate for the dry ice pellet extruder of the present invention.
Figure 12:
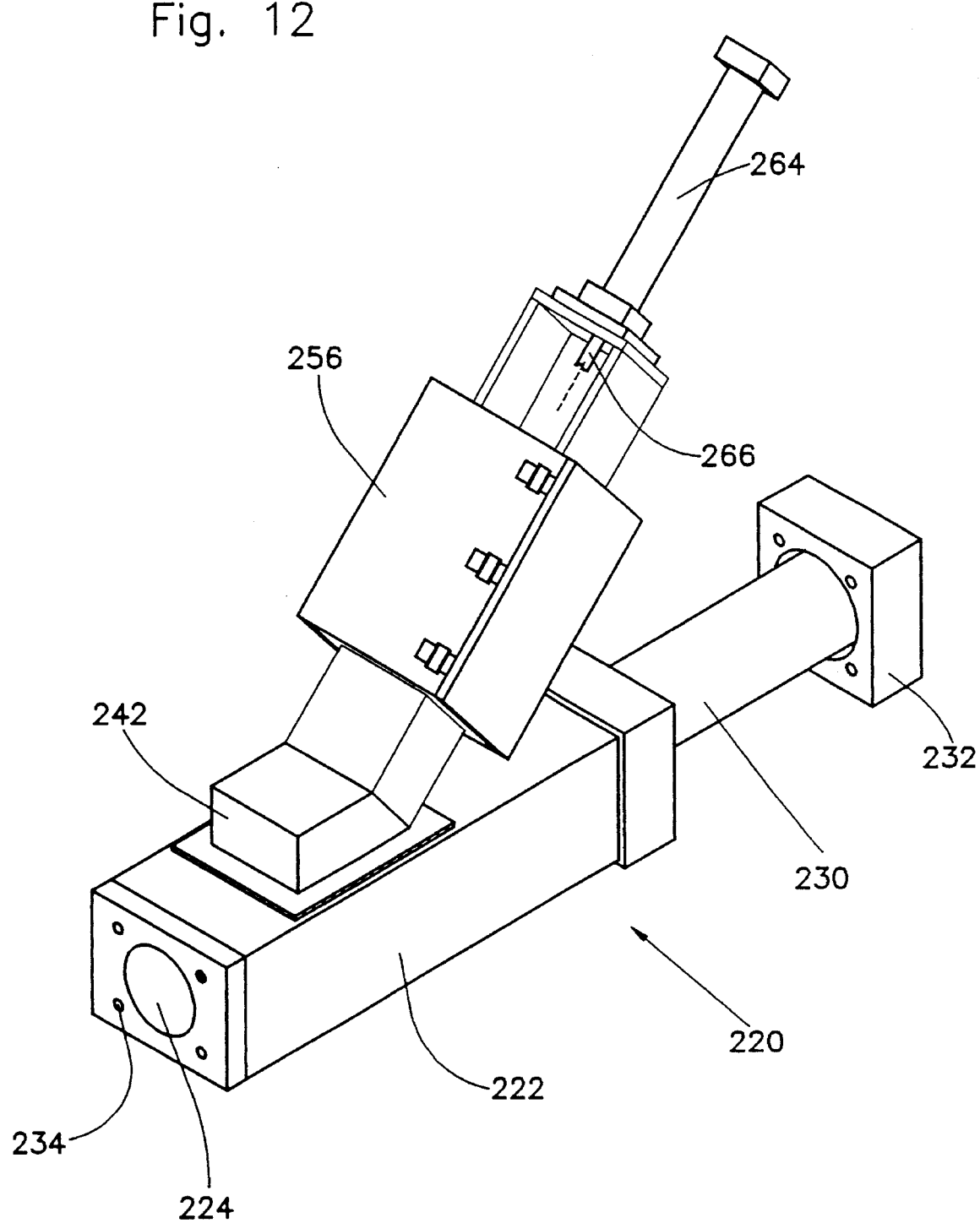
FIG. 12 is a perspective view of a third embodiment of the dry ice pellet extruder of the present invention.
Figure 13:
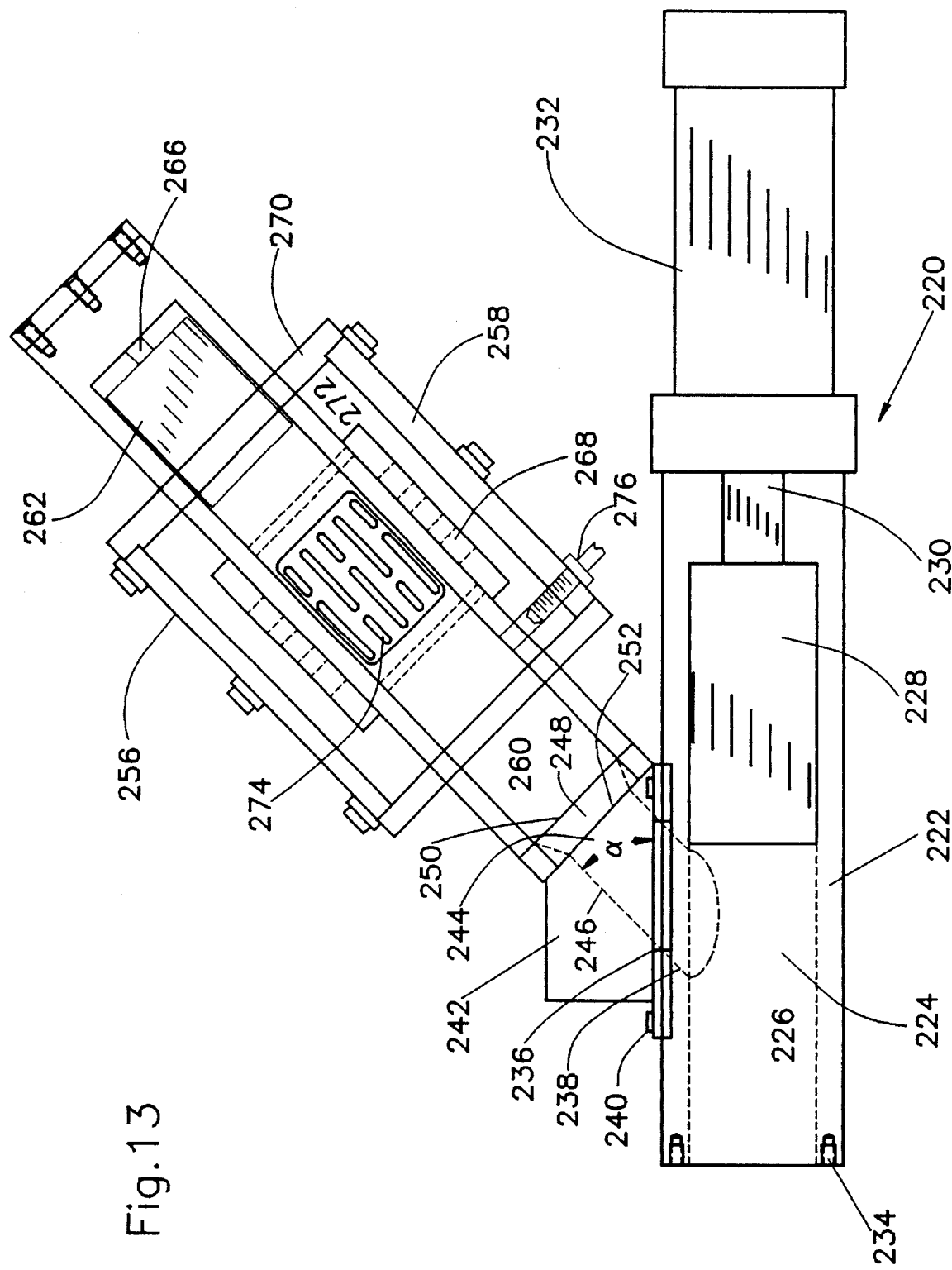
FIG. 13 is a side sectional view of the third extruder embodiment shown in FIG. 12.

A third embodiment of the invention is shown in FIGS. 12–13 in the form of pellet extruder 220. Extruder housing 222 is preferably rectangular in cross section, and has a circular bore 224 extending therethrough that is 3 inches in diameter, and constitutes extrusion chamber 226. Positioned inside extrusion-chamber 226 is piston head 228 that, in turn, is attached to piston shaft 230 and hydraulic cylinder 232 in the same close coupled manner previously described. A die plate and taper plate similar to those shown in FIGS. 6 and 7 are secured to the front end of extruder housing 222 by means of bolts (not shown) that fit in bolt holes 234.

Located along the top of the of extruder housing 222 is round hole 236 having the same 3-inch diameter as extrusion chamber 226. Hole 236 communicates with extrusion chamber 226 by means of cylindrical bore 238 that is positioned at an angle $\alpha$ with respect to the extrusion chamber.

Mounted over round hole 236 by means of bolts 240 is transition housing 242 that has within it an irregularly shaped channel 244. Extending upwardly from the round hole 236 at angle $\alpha$ is cylindrical bore zone 246 having the same 3-inch diameter. Cylindrical zone 246 yields to tapered zone 248, whose top surface comprises a square 250 measuring, e.g., 3½ inches along each side. The transformation from a 3½-inch square to a 3-inch circle in taper zone creates a lip 252, whose importance will become apparent shortly.

Mounted to transition housing 242 over square opening 250 is upper housing 256 comprising in part a chimney 258 having an internal chamber 260 of the same 3½-inch square cross section. Positioned inside chamber 260 is piston head 262, which is reciprocated by hydraulic cylinder 264 and piston shaft 266. Hydraulic cylinder 264 operates at 2500 psig with an 8-inch stroke.

Set into the surface of at least three side panels of upper housing 256 are flat filter media 268, preferably of the same sintered plastic composition as that of filter cartridge 170 shown in FIG. 8. The sintered plastic filter medium 268 is supported by a perforated metal jacket, and divides chamber 260 from extension ring 270 that surrounds the upper housing and defines $CO_2$ gas collection chamber 272. Slotted outlet vents 274 in the surface of extension ring 270 release the $CO_2$ gas. Nozzle 276 penetrates extension ring 270 and upper housing wall 256 to inject pressurized liquid $CO_2$ into chamber 260 from an associated storage tank (not shown).

Operation of dry ice pellet extruder 220 will now be described. Piston head 228 in extrusion chamber 226 is disposed in its forward position so that its side surface blocks round hole 236. Liquid $CO_2$ is injected into chamber 260, as previously described, to form $CO_2$ snow and $CO_2$ gas. The $CO_2$ gas is vented through sintered plastic filter element 268 and the abbreviated perforated metal support jacket into a collection chamber 272, whereupon it escapes through outlet vents 274.

Meanwhile, reciprocating piston head 262 inside chamber 260 rams the large mass of $CO_2$ snow against the side of piston head 228 in extrusion chamber 226 to form a $CO_2$ cartridge similar to the one shown in FIG. 9. In so doing, the snow is forced from the 3½-inch square area of chamber 260 and hole 250 through taper zone 248 and taper lip 252, and finally through the 3-inch round area of hole 236 into extrusion chamber 226 not only to increase the density of the cartridge by the resulting taper lip 252, but also to form round 3-inch edges for the cartridge so that it may fit within the extrusion chamber 226 having a 3-inch bore. It has been found that the taper lip 252 provided by the progression from 3½-inch square opening 250 to 3-inch round opening 236 yields a compacted reduction of the $CO_2$ snow exhibiting a 75% decrease in volume, and resulting increase in density.

By withdrawing the extrusion piston head 228 to the rear position while compaction piston head 262 is still advancing, the $CO_2$ snow cartridge is mechanically pushed into extrusion chamber 226 to be met by the advancing extrusion piston head, whereupon it is forced through the taper plate and die plate to extrude dry ice pellets to complete the extrusion cycle. Like pellet extrusion machine 80, the $CO_2$ snow formation, cartridge compaction, and dry ice extrusion steps occur simultaneously in extruder 220 to maximize the production rate. However, unlike extruder 80, material feeder 100 and actuator mechanism 110 are dispensed with, and $CO_2$ snow is forced through taper region 252 to form compacted solids, and then mechanically forced into extrusion chamber 226, instead of relying upon gravity to drop any compacted solids through outlet port 106 in feed housing 102. This increases production over the 500 lbs/hr rate of extruder 80.

Figure 14:
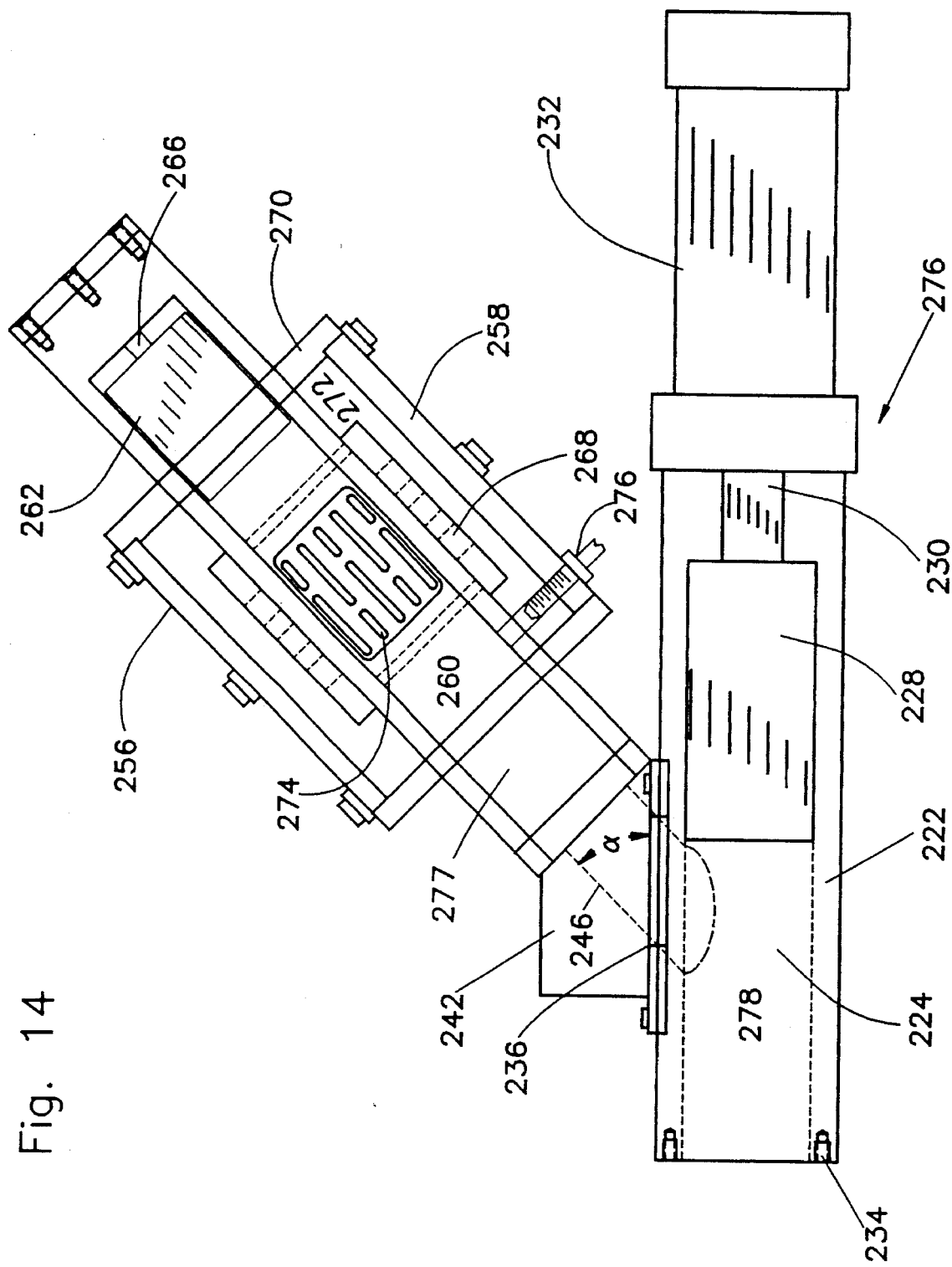
FIG. 14 is a side sectional view of a fourth extruder embodiment of the present invention.

It has been found that extruder 220 may be modified to form extruder 276, as shown in FIG. 14, to dispense with taper region 252 entirely. Instead, a 3-inch square upper chamber 277 having a cross-sectional area of 9 $in^2$ yields to an extrusion chamber 278 having a 3¼-inch diameter and a 8.3 $in^2$ cross-sectional area, instead of the 12.25 $in^2$ and 7.1 $in^2$ cross-sectional areas of upper chamber 260 and extrusion chamber 226, respectively, of extruder 220 shown in FIG. 13. Because of the almost identical cross-sectional areas, a volume of $CO_2$ snow is pushed by piston head 262 directly into extrusion chamber 278 with minimal resistance, because of the absence of a tapered region or lip to maximize the feed volume of $CO_2$ snow to extrusion chamber 278. In this manner, the snow is molded into a compacted solid having the shape of the extrusion bore, and volume reduced by 50–75%. The overall production of dry ice pellets is increased to 700 lbs/hr, and it is believed that at least 1000 lbs/hr is obtainable with an 8-inch piston stroke.

Figure 15:
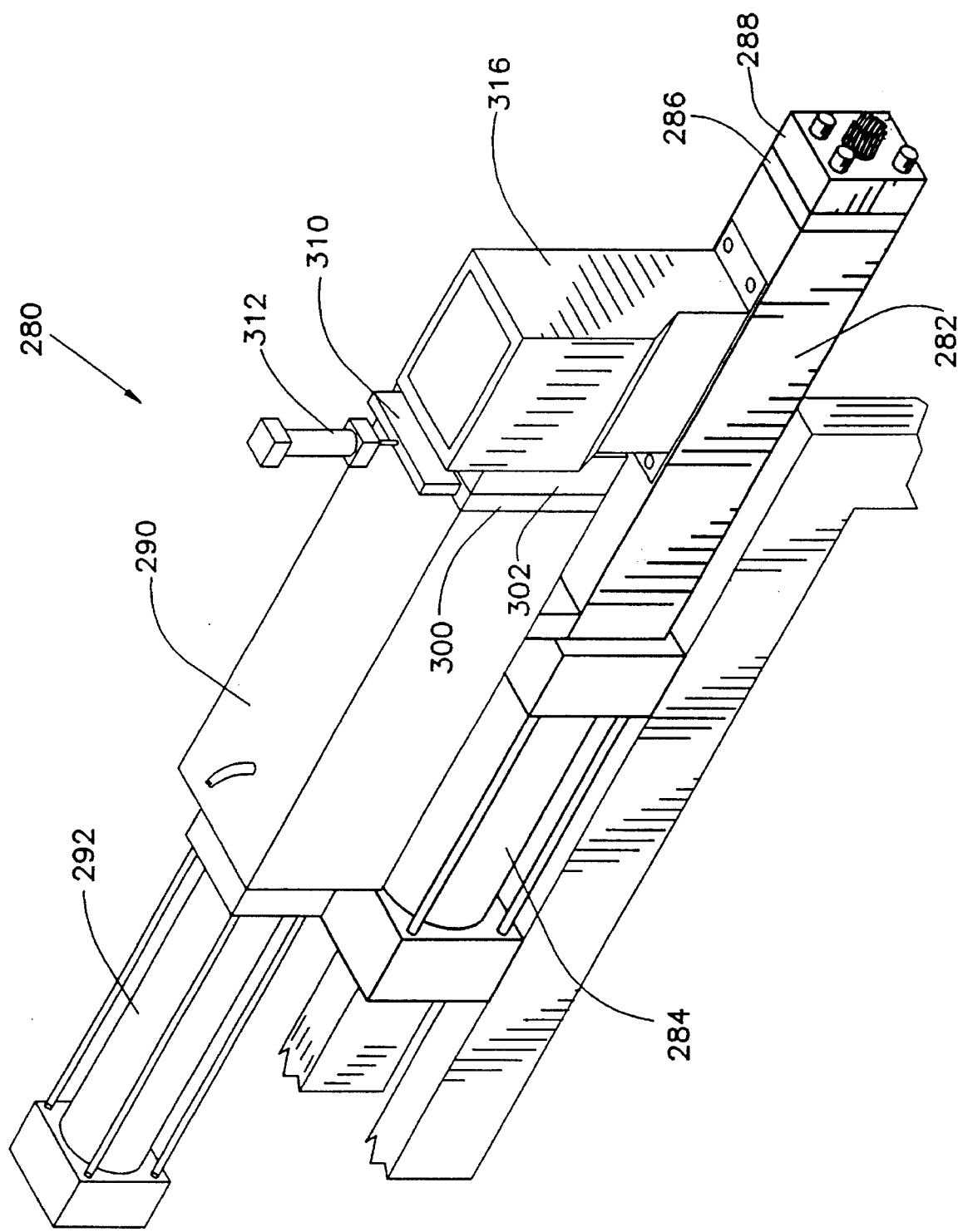
FIG. 15 is a perspective view of a fifth embodiment of the dry ice pellet extruder of the present invention.
Figure 16:
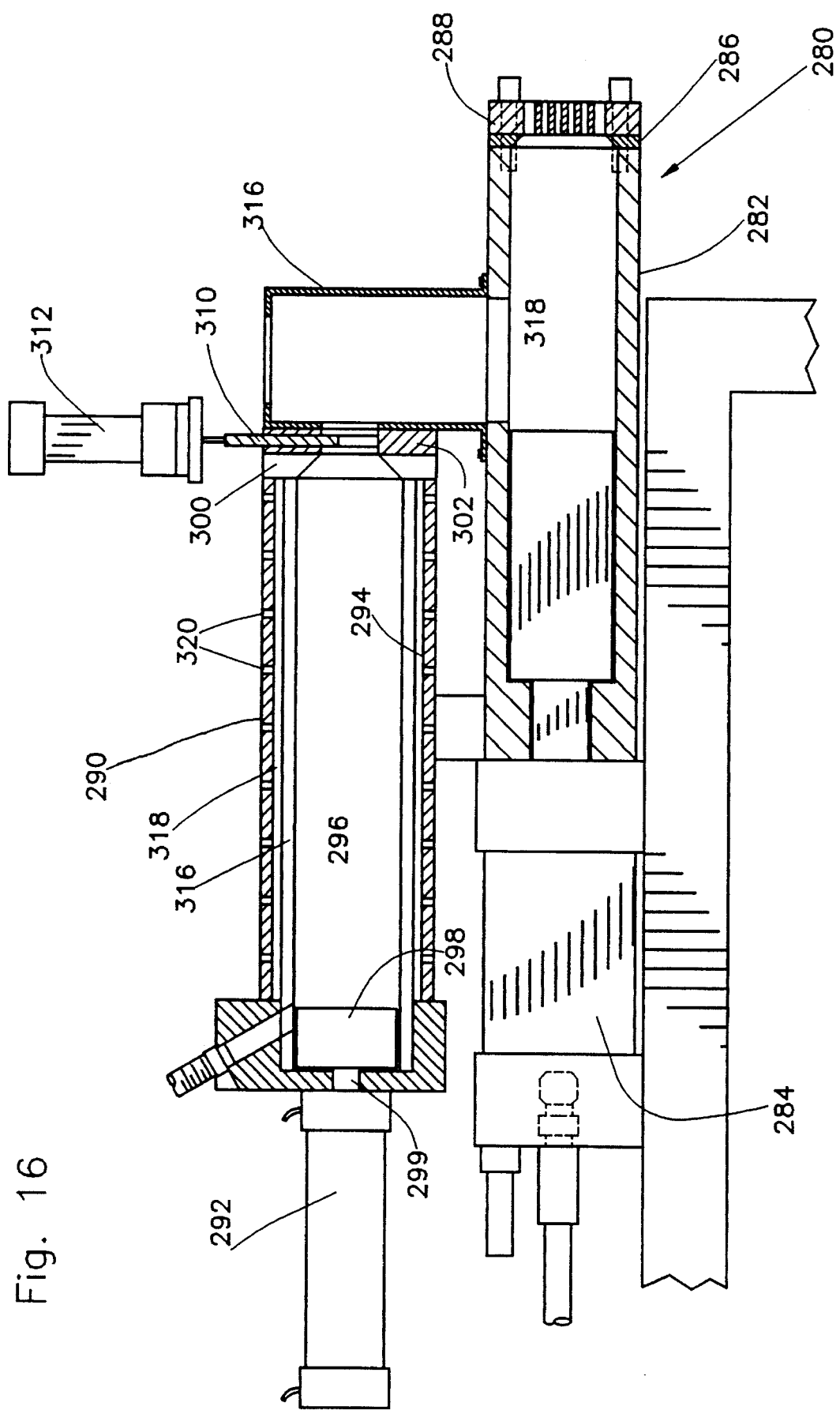
FIG. 16 is a side sectional view of the fifth extruder embodiment shown in FIG. 15.

A fifth embodiment of the invention is illustrated by FIGS. 15–16, showing pellet extruder 280. Lower housing 282, hydraulic cylinder 284, extrusion chamber 318, taper plate 286, and die plate 288 remain unchanged from the corresponding components shown in FIGS. 4–7. Upper housing 290, however, is rectangular in cross section and has hydraulic cylinder 292 close coupled thereto. The bore 294 inside upper housing 290 is square in cross section with each side measuring, e.g., 3 inches, and defines chamber 296. A rectangular piston head 298 made of nylon is positioned inside chamber 296, and is operated by hydraulic cylinder 292 and piston shaft 299.

Figure 17:
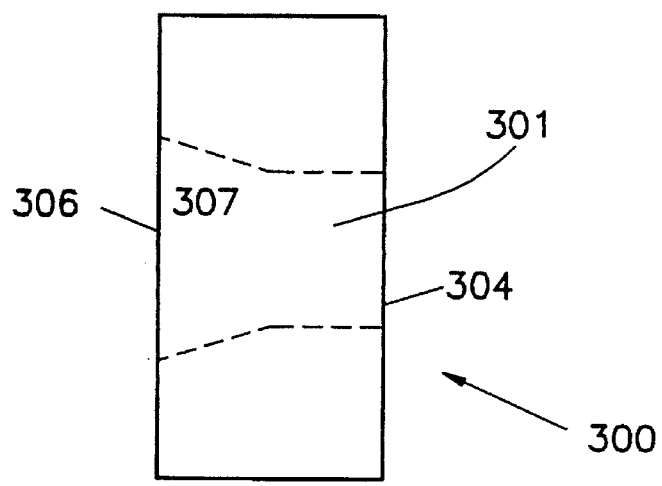
FIG. 17 is a side sectional view of a compaction chamber taper plate for the fourth extruder embodiment shown in FIG. 15.

Attached to the front end of upper housing 290 is taper plate 300, better shown in FIG. 17. It comprises a square disk having a bore 301 therethrough that is 3 inches square at its upstream end 306 and 2½ inches at its downstream end 304, with a tapered region 307 therebetween.

Figure 18:
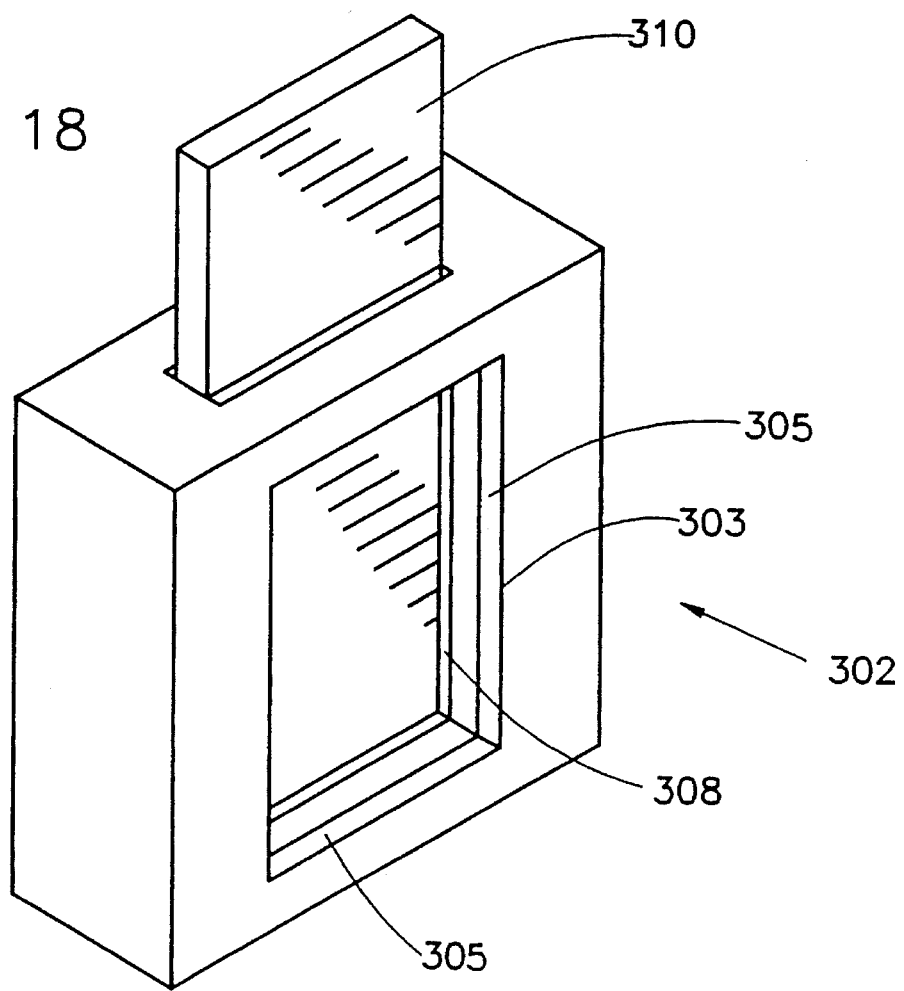
FIG. 18 is a perspective view of a compaction chamber die plate for the fourth extruder embodiment shown in FIG. 15.

Attached to the downstream face of taper plate 300 is die plate 302 that is illustrated in FIG. 18. It bears a single, square hole 303 having a $\frac{1}{16}$-inch beveled lip 305 extending along its internal perimeter. A channel 308 is machined in die plate 302 parallel to its upstream and downstream faces for accommodating a barrier gate 310 operated by an actuator 312.

Operation of extruder 280 will now be explained. Liquid $CO_2$ is injected into chamber 296, whereupon $CO_2$ snow and $CO_2$ gas are formed. The $CO_2$ gas passes through a flat filter media positioned along at least one flat wall of chamber 296, and supported by perforated metal support screen 316. Upon entering $CO_2$ gas collection zone 318, it is vented through holes 320 in the upper housing walls 290.

With barrier gate 310 in the down position so as to close off the passage to die plate orifice 303, piston head 298 advances to compact the $CO_2$ snow into a rectangularly shaped cartridge. It is further compacted by the tapered bore 302 of taper plate 300 in the process. Once barrier gate 310 is raised by air actuator 312, however, the advancing piston head 298 continues to push the $CO_2$ snow cartridge through the downstream face 306 of taper plate and through die plate hole 303. In so doing, beveled lip 304 of die plate 302 causes the advanced portion of the $CO_2$ snow cartridge to fracture into a multitude of compacted, irregularly shaped $CO_2$ snow pieces, which then are pushed through feed chute 316 into the extrusion chamber.

It will be appreciated throughout subsequent compaction cycles that a portion of the $CO_2$ snow cartridge will be increased along the upstream end inside compaction chamber 296, while a roughly equal portion along the downstream end of the cartridge is fractured by beveled lip 304 to form the small, irregularly shaped pieces that can be easily dropped randomly through feed chute 316 into extrusion chamber 318 without regard to orientation. This advantage is particularly noteworthy should a screw extruder with helical flights be used in place of the piston head inside the extrusion chamber, since the small, irregularly-shaped compacted $CO_2$ chunks can fall between the flights. It is estimated that extruder 280 can produce 540 lbs/hr of dry ice pellets.

The exterior housing parts of pellet extruder 80, 190, 220, 276, and 280 are preferably made from 7075-T6 aircraft grade aluminum, compared with 1026 grade carbon steel used for prior art extruders, as follows:

|                  | 7075-T6 Aluminum | 1026 Carbon Steel |
|------------------|------------------|-------------------|
| Weight           | 30 lbs           | 100 lbs           |
| Yield            | 73,000 psi       | 75,000 psi        |
| Tensile Strength | 83,000 psi       | 85,000 psi        |

Thus, while the aircraft grade aluminum exhibits yield and tensile strength characteristics comparable to those of carbon steel, it is much lighter in weight, contributing greatly to the portability of the dry ice pellet extruders of the present invention. Moreover, the low temperatures that dry ice pellet extruders inherently operate at have been found to enhance the strength of the aluminum material, while diminishing the strength of the carbon steel material. Furthermore, the aluminum material transfers heat more effectively, thereby providing for a more rapid cool-down and/or thawing cycle for operating or servicing efficiencies. The piston heads are also preferably made from NYLON®.

The invention may also substitute bidirectional internal regeneration hydraulic cylinders for conventional hydraulic cylinders used in prior art pellet extruders. As typified by those manufactured by Air-dro, such bidirectional internal regeneration hydraulic cylinders integrate a cartridge valve into the blind end of the cylinder, and internally attach a tube to the blind end extending into the hollow cylindrical rod. The cylinder rod is internally ported to this tube to provide a flow path for the rod annulus oil to be combined with the oil in the blind end during extension. During extension, the flow path out of the rod end of the cylinder is blocked by a pilot-operated check valve. An additional cartridge valve is used in the blind end of larger bore cylinders to provide a flow path for the hydraulic oil back to the tank for the return of the stroke. The resulting regenerative circuitry reduces cycle time for the forward motion of the hydraulic cylinder to accommodate increased compaction and extrusion rates in the dry ice pellet extruders. Moreover, use of the bidirectional internal regeneration hydraulic cylinder requires a smaller pump and oil reservoir for its operation, as well as the size of the overall hydraulic cylinder system. Thus, extruders 80, 190, 220, 276, and 280 may be made smaller in volume, as well.

The bidirectional internal regeneration hydraulic cylinders of pellet extruder 80 may be driven by gasoline, diesel, or propane engines. The industry has always used electric motors to drive the prior art pellet extruders, which in turn, required large generators, or an available source of electric current. By using internal combustion engines, pellet extruder 80 is portable and mobile in the field.

In order to demonstrate the significance of utilizing a sintered plastic filter media in the apparatus of the present invention as compared with prior art sintered metal filter media, a comparative test was conducted utilizing the identical dry ice pellet extruding apparatus fitted in a first embodiment with a sintered plastic filter media and in a second embodiment with a sintered metal filter media (i.e., sintered bronze).

The sintered plastic filter media employed in this test was a proprietary blend manufactured and sold by Porex Technologies, Inc. and contained a binary blend of larger size particles of high-density polyethylene with a fine particle, ultra-high molecular weight polyethylene. The sintered plastic media was in the shape of a one quarter inch thick sheet and had a non-uniform porosity of 45–90 microns and a void fraction of 40% to 45%.

Attempts to utilize sintered metal filter media with porosity levels lower than 140 microns (e.g., about 90 microns) resulted in unacceptably low production rates since insufficient venting was achieved. Accordingly, the sintered metal filter media employed for this testing consisted of a first layer of one eighth inch thick sheet, 140 micron porosity material and a second layer one eighth inch thick of 150 micron porosity. Both layers were formed from sintered bronze and with each layer having a uniform porosity and a uniform particle composition.

The test conditions for running the pelletizer machine were as follows:

Full Cycle Time: Twelve (12) seconds

Injection Time: Six (6) seconds

Dry Ice Pellet Size: ⅛ inch diameter

Tank Pressure: 350 PSIG

Hydraulic Cylinder: 3¼ inch bore

Injection Pressures: 60–20 PSIG

Cycles: 20

As a result of this testing, it was determined that the production rates utilizing the sintered plastic filter media was 23.5 pounds over a period of four minutes constituting 20 cycles of the machine at 12 seconds per cycle. The production rate for the apparatus equipped with the sintered bronze filter media totalled 18 pounds over the same four minute period constituting 20 cycles at 12 second per cycle.

Thus, the use of the sintered binary plastic filter media was shown to produce over 30% more dry ice resulting from the improved venting of gaseous $CO_2$ and improved separation of snow particles as compared with an apparatus utilizing a sintered metal filter media.

In this regard, it should be noted that when sintered metal media was employed in these pelletizer devices, injection flow rates and the pressure in the compaction and extrusion chamber had to be reduced in order to achieve conditions required for rapid transformation of liquified $CO_2$ to snow particles. This resulted in the significant reduction in production rate relative to the apparatus employing sintered plastic media.

In addition, snow particles were evident in the discharge vent gas when sintered metal filter media was utilized. Also, with continuing use of the apparatus, filter snow blockage was exhibited as evidenced by an examination of the filter and in view of the fact that fewer snow particles were observed in the discharge gas with continuing use. This further evidenced blockage of the surface pores with compacted snow. Also, in continued testing of sintered metal filter media on the apparatus of the present invention, some cracking of the sintered metal filters was observed during operation.

Utilizing the binary composition plastic filter media of the present invention in the apparatus, no snow blockage was evident and no cracking of the filters as a result of the ambient conditions of operation were detected. Accordingly, this test clearly demonstrated the substantial advantages obtained when sintered plastic filter media is employed rather than sintered metal.

While particular embodiments of the invention have been shown and described, it should be understood that the invention is not limited thereto, since many modifications may be made. For instance, a screw auger could be used in the compaction and/or extrusion chambers instead of a hydraulic piston head to move the compacted or uncompacted $CO_2$ snow particles along toward the die plate. Moreover, snow particles could be blown through counter-revolving rollers having serrated edges to produce a flat sheet of dry ice that is subsequently fractured by another pair of serrated rollers to produce irregularly shaped pellets that could be used for sandblasting and refrigeration applications. The invention is therefore contemplated to cover by the present application any and all such modifications which fall within the true spirit and scope of the basic underlying principles disclosed and claimed herein.

We claim:

1. An apparatus for producing dry ice pellets from an injected pressurized liquid carbon dioxide ($CO_2$) feed, comprising:

means for transforming the liquid $CO_2$ feed into $CO_2$ snow particles and $CO_2$ gas, and for selectively exhausting the $CO_2$ gas, comprising a chamber maintained at a pressure lower than said liquid $CO_2$ injection pressure into which the liquid $CO_2$ is transformed into $CO_2$ snow particles and $CO_2$ gas, said chamber having an outlet port for removal of the $CO_2$ snow particles and a wall formed with a filter medium therein, the filter medium consisting of a sintered particulate plastic material comprising a blend of polymers having irregular distribution and nonuniform particle size, said sintered particulate plastic material having a plurality of tortuous and irregularly shaped air passages formed therein between the sintered particles for separating the $CO_2$ snow particles from the $CO_2$ gas to vent the $CO_2$ gas to the atmosphere while containing the $CO_2$ snow particles inside said $CO_2$ chamber;

means for compacting the $CO_2$ snow particles into a solid cartridge or an irregularly shaped solid form, having increased density; and means for extruding the solid $CO_2$ snow cartridge or an irregularly shaped solid form into dry ice pellets of predetermined shape and size.

2. The apparatus of claim 1 wherein said blend of polymers comprises a mixture of polymeric constituents having varying particle size and shape.

3. The apparatus of claim 1 wherein said sintered particulate plastic material is a binary blend of high density polyethylene and ultra-high molecular weight polyethylene.

4. The apparatus of claim 3 wherein said high density polyethylene comprises large size particles that remain flexible at a transformation temperature of carbon dioxide.

5. The apparatus of claim 4 wherein said ultra-high molecular weight polyethylene is essentially rigid at said transformation temperature.

6. A method for producing dry ice pellets from an injected pressurized liquid $CO_2$ feed comprising the steps of:

maintaining a first chamber at a pressure lower than that of the injected pressurized liquid $CO_2$ feed and converting said liquid $CO_2$ into $CO_2$ snow particles and $CO_2$ gas in said chamber;

selectively separating the $CO_2$ snow particles from the $CO_2$ gas formed in said first chamber by venting said $CO_2$ gas to the atmosphere through a filter medium formed in a wall of said first chamber while containing the $CO_2$ snow particles inside said first chamber, said filter medium comprising a sintered particulate plastic material comprising a blend of polymers having irregular distribution and nonuniform particle size and having a plurality of tortuous and irregularly shaped air passages formed therein between the sintered particles; and compacting the $CO_2$ snow particles in said first chamber into a first solid cartridge or irregularly shaped solid form having increased density.

7. The method of claim 6 wherein said sintered particulate plastic material comprises a mixture of polymeric constituents having varying particle size and shape.

8. The method of claim 6 wherein said sintered particulate plastic material comprises a blend of high density polyethylene and ultra-high molecular weight polyethylene.

9. The method of claim 8 wherein said high density polyethylene comprises large size particles that remain flexible at a transformation temperature of carbon dioxide.

10. The method of claim 9 wherein said ultra-high molecular weight polyethylene is essentially rigid at said transformation temperature.

* * * * *